(12) United States Patent
Reed

(10) Patent No.: US 9,185,777 B2
(45) Date of Patent: Nov. 10, 2015

(54) AMBIENT LIGHT CONTROL IN SOLID STATE LAMPS AND LUMINAIRES

(71) Applicant: Express Imaging Systems, LLC, Renton, WA (US)

(72) Inventor: William G. Reed, Seattle, WA (US)

(73) Assignee: Express Imaging Systems, LLC, Renton, WA (US)

( * ) Notice: Subject to any disclaimer, the term of this patent is extended or adjusted under 35 U.S.C. 154(b) by 0 days.

(21) Appl. No.: 14/609,168

(22) Filed: Jan. 29, 2015

(65) Prior Publication Data

US 2015/0216016 A1 Jul. 30, 2015

Related U.S. Application Data

(60) Provisional application No. 61/933,733, filed on Jan. 30, 2014.

(51) Int. Cl.
*H05B 37/02* (2006.01)
*H05B 33/08* (2006.01)

(52) U.S. Cl.
CPC ........ *H05B 37/0218* (2013.01); *H05B 33/0854* (2013.01); *H05B 37/0281* (2013.01)

(58) Field of Classification Search
CPC .... H05B 37/00; H05B 37/02; H05B 37/0218; H05B 37/0227; H05B 37/0281; H05B 33/08; H05B 33/0833; H05B 33/0848; H05B 33/0851; H05B 33/0854; Y02B 20/42
USPC ......... 315/149–153, 157, 291, 307, 308, 312, 315/318, 360, 361, 363
See application file for complete search history.

(56) References Cited

U.S. PATENT DOCUMENTS 2,745,055 A 5/1956 Woerdemann
4,153,927 A 5/1979 Owens
(Continued)

FOREIGN PATENT DOCUMENTS

DE 4001980 A1 8/1990
EP 1 734 795 A1 12/2006
(Continued)

OTHER PUBLICATIONS

"Lcd Backlight I/O Ports and Power Protection Circuit Design," dated May 2, 2011, retrieved Jun. 10, 2011, retrieved from http://www.chipoy.info/gadgets/lcd-backlight-i-o-ports-and-power-pr . . . , 4 pages.
(Continued)

*Primary Examiner* — Jimmy Vu
(74) *Attorney, Agent, or Firm* — Seed IP Law Group PLLC

(57) ABSTRACT

A luminaire comprising a solid-state light source and a photosensitive transducer each operatively coupled to a controller. The photosensitive transducer is oriented to be within an illumination path of the solid-state light source. When the solid-state light source is in an ON state in which at least some light is produced, the controller controls the solid-state light source to be in the OFF state in which no light is produced for a brief measurement period imperceptible to a human. During the measurement period the controller obtains an ambient light level measurement from the photosensitive transducer without interference from the solid-state light source, which is in the OFF state. The controller may record turn ON and turn OFF times of the solid-state light source for use in controlling the solid-state light source in various circumstances.

28 Claims, 7 Drawing Sheets

(56) References Cited

U.S. PATENT DOCUMENTS

| | | |
|---|---|---|
| 4,237,377 A | 12/1980 | Sansum |
| 4,663,521 A | 5/1987 | Maile |
| 5,086,379 A | 2/1992 | Denison et al. |
| 5,160,202 A | 11/1992 | Légaré |
| 5,161,107 A | 11/1992 | Mayeaux et al. |
| 5,230,556 A | 7/1993 | Canty et al. |
| 5,276,385 A | 1/1994 | Itoh et al. |
| 5,343,121 A | 8/1994 | Terman et al. |
| 5,349,505 A | 9/1994 | Poppenheimer |
| 5,450,302 A | 9/1995 | Maase et al. |
| 5,561,351 A | 10/1996 | Vrionis et al. |
| 5,589,741 A | 12/1996 | Terman et al. |
| 5,808,294 A | 9/1998 | Neumann |
| 6,111,739 A | 8/2000 | Wu et al. |
| 6,149,283 A | 11/2000 | Conway et al. |
| 6,377,191 B1 | 4/2002 | Takubo |
| 6,612,720 B1 | 9/2003 | Beadle |
| 6,674,060 B2 | 1/2004 | Antila |
| 6,681,195 B1 | 1/2004 | Poland et al. |
| 6,746,274 B1 | 6/2004 | Verfuerth |
| 6,753,842 B1 | 6/2004 | Williams et al. |
| 6,828,911 B2 | 12/2004 | Jones et al. |
| 6,841,947 B2 | 1/2005 | Berg-Johansen |
| 6,902,292 B2 | 6/2005 | Lai |
| 6,985,827 B2 | 1/2006 | Williams et al. |
| 7,019,276 B2 | 3/2006 | Cloutier et al. |
| 7,066,622 B2 | 6/2006 | Alessio |
| 7,081,722 B1 | 7/2006 | Huynh et al. |
| 7,122,976 B1 | 10/2006 | Null et al. |
| 7,188,967 B2 | 3/2007 | Dalton et al. |
| 7,196,477 B2 | 3/2007 | Richmond |
| 7,239,087 B2 | 7/2007 | Ball |
| 7,252,385 B2 | 8/2007 | Engle et al. |
| 7,258,464 B2 | 8/2007 | Morris et al. |
| 7,270,441 B2 | 9/2007 | Fiene |
| 7,281,820 B2 | 10/2007 | Bayat et al. |
| 7,314,291 B2 | 1/2008 | Tain et al. |
| 7,317,403 B2 | 1/2008 | Grootes et al. |
| 7,322,714 B2 | 1/2008 | Barnett et al. |
| 7,330,568 B2 | 2/2008 | Nagaoka et al. |
| 7,339,323 B2 | 3/2008 | Bucur |
| 7,339,471 B1 | 3/2008 | Chan et al. |
| 7,405,524 B2 | 7/2008 | Null et al. |
| 7,438,440 B2 | 10/2008 | Dorogi |
| 7,440,280 B2 | 10/2008 | Shuy |
| 7,468,723 B1 | 12/2008 | Collins |
| 7,524,089 B2 | 4/2009 | Park |
| 7,538,499 B2 | 5/2009 | Ashdown |
| 7,547,113 B2 | 6/2009 | Lee |
| 7,559,674 B2 | 7/2009 | He et al. |
| 7,564,198 B2 | 7/2009 | Yamamoto et al. |
| 7,569,802 B1 | 8/2009 | Mullins |
| 7,578,596 B2 | 8/2009 | Martin |
| 7,578,597 B2 | 8/2009 | Hoover et al. |
| 7,627,372 B2 | 12/2009 | Vaisnys et al. |
| 7,631,324 B2 | 12/2009 | Buonasera et al. |
| 7,633,463 B2 | 12/2009 | Negru |
| 7,638,743 B2 | 12/2009 | Bartol et al. |
| 7,677,753 B1 | 3/2010 | Wills |
| 7,688,002 B2 | 3/2010 | Ashdown et al. |
| 7,688,222 B2 | 3/2010 | Peddie et al. |
| 7,703,951 B2 | 4/2010 | Piepgras et al. |
| 7,746,003 B2 | 6/2010 | Verfuerth et al. |
| D621,410 S | 8/2010 | Verfuerth et al. |
| D621,411 S | 8/2010 | Verfuerth et al. |
| 7,804,200 B2 | 9/2010 | Flaherty |
| 7,834,922 B2 | 11/2010 | Kurane |
| 7,932,535 B2 | 4/2011 | Mahalingam et al. |
| 7,940,191 B2 | 5/2011 | Hierzer |
| 7,952,609 B2 | 5/2011 | Simerly et al. |
| 7,960,919 B2 | 6/2011 | Furukawa |
| 7,983,817 B2 | 7/2011 | Breed |
| 7,985,005 B2 | 7/2011 | Alexander et al. |
| 8,100,552 B2 | 1/2012 | Spero |
| 8,118,456 B2 | 2/2012 | Reed et al. |
| 8,143,769 B2 | 3/2012 | Li |
| 8,174,212 B2 | 5/2012 | Tziony et al. |
| 8,334,640 B2 | 12/2012 | Reed et al. |
| 8,344,665 B2 | 1/2013 | Verfuerth et al. |
| 8,376,583 B2 | 2/2013 | Wang et al. |
| 8,378,563 B2 | 2/2013 | Reed et al. |
| 8,445,826 B2 | 5/2013 | Verfuerth |
| 8,450,670 B2 | 5/2013 | Verfuerth et al. |
| 8,476,565 B2 | 7/2013 | Verfuerth |
| 8,508,137 B2 | 8/2013 | Reed |
| 8,541,950 B2 | 9/2013 | Reed |
| 8,586,902 B2 | 11/2013 | Verfuerth |
| 8,604,701 B2 | 12/2013 | Verfuerth et al. |
| 8,610,358 B2 | 12/2013 | Reed |
| 8,629,621 B2 | 1/2014 | Reed |
| 8,749,635 B2 | 6/2014 | Högasten et al. |
| 8,764,237 B2 | 7/2014 | Wang et al. |
| 8,779,340 B2 | 7/2014 | Verfuerth et al. |
| 8,810,138 B2 | 8/2014 | Reed |
| 8,866,582 B2 | 10/2014 | Verfuerth et al. |
| 8,872,964 B2 | 10/2014 | Reed et al. |
| 8,878,440 B2 | 11/2014 | Reed |
| 8,884,203 B2 | 11/2014 | Verfuerth et al. |
| 8,896,215 B2 | 11/2014 | Reed et al. |
| 8,901,825 B2 | 12/2014 | Reed |
| 8,921,751 B2 | 12/2014 | Verfuerth |
| 8,922,124 B2 | 12/2014 | Reed et al. |
| 8,926,138 B2 | 1/2015 | Reed et al. |
| 8,926,139 B2 | 1/2015 | Reed et al. |
| 2003/0016143 A1 | 1/2003 | Ghazarian |
| 2003/0184672 A1 | 10/2003 | Wu et al. |
| 2004/0192227 A1 | 9/2004 | Beach et al. |
| 2005/0231133 A1 | 10/2005 | Lys |
| 2006/0014118 A1 | 1/2006 | Utama |
| 2006/0066264 A1 | 3/2006 | Ishigaki et al. |
| 2006/0098440 A1 | 5/2006 | Allen |
| 2007/0032990 A1 | 2/2007 | Williams et al. |
| 2007/0102033 A1 | 5/2007 | Petrocy |
| 2007/0225933 A1 | 9/2007 | Shimomura |
| 2008/0018261 A1 | 1/2008 | Kastner |
| 2008/0043106 A1 | 2/2008 | Hassapis et al. |
| 2008/0130304 A1 | 6/2008 | Rash et al. |
| 2008/0232116 A1 | 9/2008 | Kim |
| 2008/0266839 A1 | 10/2008 | Claypool et al. |
| 2009/0046151 A1 | 2/2009 | Nagaoka et al. |
| 2009/0058320 A1 | 3/2009 | Chou et al. |
| 2009/0160358 A1 | 6/2009 | Leiderman |
| 2009/0161356 A1 | 6/2009 | Negley et al. |
| 2009/0167203 A1 | 7/2009 | Dahlman et al. |
| 2009/0195179 A1 | 8/2009 | Joseph et al. |
| 2009/0230883 A1 | 9/2009 | Haug |
| 2009/0235208 A1 | 9/2009 | Nakayama et al. |
| 2009/0261735 A1 | 10/2009 | Sibalich et al. |
| 2009/0268023 A1 | 10/2009 | Hsieh |
| 2009/0278479 A1 | 11/2009 | Platner et al. |
| 2010/0001652 A1 | 1/2010 | Damsleth |
| 2010/0052557 A1 | 3/2010 | Van Der Veen et al. |
| 2010/0096460 A1 | 4/2010 | Carlson et al. |
| 2010/0123403 A1 | 5/2010 | Reed |
| 2010/0164406 A1 | 7/2010 | Kost et al. |
| 2010/0171442 A1* | 7/2010 | Draper et al. ............... 315/297 |
| 2010/0259193 A1 | 10/2010 | Umezawa et al. |
| 2010/0271802 A1 | 10/2010 | Recker et al. |
| 2010/0309310 A1 | 12/2010 | Albright |
| 2011/0001626 A1 | 1/2011 | Yip et al. |
| 2011/0006703 A1 | 1/2011 | Wu et al. |
| 2011/0026264 A1 | 2/2011 | Reed et al. |
| 2011/0215731 A1 | 9/2011 | Jeong et al. |
| 2011/0221346 A1 | 9/2011 | Lee et al. |
| 2011/0251751 A1 | 10/2011 | Knight |
| 2011/0310605 A1 | 12/2011 | Renn et al. |
| 2012/0001566 A1* | 1/2012 | Josefowicz et al. ......... 315/291 |
| 2012/0019971 A1 | 1/2012 | Flaherty et al. |
| 2012/0038490 A1 | 2/2012 | Verfuerth |
| 2012/0119669 A1 | 5/2012 | Melanson et al. |
| 2012/0169053 A1 | 7/2012 | Tchoryk, Jr. et al. |
| 2012/0209755 A1 | 8/2012 | Verfuerth et al. |
| 2012/0221154 A1 | 8/2012 | Runge |
| 2012/0224363 A1 | 9/2012 | Van De Ven |

(56) References Cited

U.S. PATENT DOCUMENTS

| | | |
|---|---|---|
| 2012/0230584 A1 | 9/2012 | Kubo et al. |
| 2013/0033183 A1 | 2/2013 | Verfuerth et al. |
| 2013/0126715 A1 | 5/2013 | Flaherty |
| 2013/0131882 A1 | 5/2013 | Verfuerth et al. |
| 2013/0141000 A1 | 6/2013 | Wei et al. |
| 2013/0163243 A1 | 6/2013 | Reed |
| 2013/0193857 A1 | 8/2013 | Tlachac et al. |
| 2013/0229518 A1 | 9/2013 | Reed et al. |
| 2013/0235202 A1 | 9/2013 | Nagaoka et al. |
| 2013/0293112 A1 | 11/2013 | Reed et al. |
| 2013/0313982 A1 | 11/2013 | Reed |
| 2013/0340353 A1 | 12/2013 | Whiting et al. |
| 2014/0001961 A1 | 1/2014 | Anderson et al. |
| 2014/0028198 A1 | 1/2014 | Reed et al. |
| 2014/0055990 A1 | 2/2014 | Reed |
| 2014/0078308 A1 | 3/2014 | Verfuerth |
| 2014/0097759 A1 | 4/2014 | Verfuerth et al. |
| 2014/0139116 A1 | 5/2014 | Reed |
| 2014/0159585 A1 | 6/2014 | Reed |
| 2014/0225521 A1 | 8/2014 | Reed |
| 2014/0313719 A1 | 10/2014 | Wang et al. |
| 2014/0320027 A1 | 10/2014 | Reed |
| 2015/0015716 A1 | 1/2015 | Reed et al. |
| 2015/0077019 A1 | 3/2015 | Reed et al. |
| 2015/0084520 A1 | 3/2015 | Reed |

FOREIGN PATENT DOCUMENTS

| | | |
|---|---|---|
| EP | 2 781 138 A1 | 9/2014 |
| FR | 2 883 306 A1 | 9/2006 |
| JP | 6-3352741 A | 12/1994 |
| JP | 2001-333420 A | 11/2001 |
| JP | 2004-279668 A | 10/2004 |
| JP | 2004-320024 A | 11/2004 |
| JP | 2004-349065 A | 12/2004 |
| JP | 2005-93171 A | 4/2005 |
| JP | 2005-198238 A | 7/2005 |
| JP | 2005-310097 A | 11/2005 |
| JP | 2006-179672 A | 7/2006 |
| JP | 2006-244711 A | 9/2006 |
| JP | 2008-59811 A | 3/2008 |
| JP | 2008-509538 A | 3/2008 |
| JP | 2008-130523 A | 6/2008 |
| JP | 2008-159483 A | 7/2008 |
| JP | 2008-177144 A | 7/2008 |
| JP | 2008-535279 A | 8/2008 |
| JP | 2010-504628 A | 2/2010 |
| KR | 2005078403 A | 8/2005 |
| KR | 10-2006-0086254 A | 7/2006 |
| KR | 10-2009-0042400 A | 4/2009 |
| KR | 10-0935736 B1 | 1/2010 |
| KR | 20-2010-0007230 U | 7/2010 |
| KR | 10-1001276 B1 | 12/2010 |
| KR | 10-1044224 B1 | 6/2011 |
| KR | 10-1150876 B1 | 5/2012 |
| WO | 02/076068 A1 | 9/2002 |
| WO | 03/056882 A1 | 7/2003 |
| WO | 2006/057866 A2 | 6/2006 |
| WO | 2007/023454 A1 | 3/2007 |
| WO | 2007/036873 A2 | 4/2007 |
| WO | 2008/030450 A2 | 3/2008 |
| WO | 2008/034242 A1 | 3/2008 |
| WO | 2009/040703 A2 | 4/2009 |
| WO | 2012/006710 A1 | 1/2012 |
| WO | 2012/142115 A2 | 10/2012 |
| WO | 2013/074900 A1 | 5/2013 |
| WO | 2014/018773 A1 | 1/2014 |
| WO | 2014/039683 A1 | 3/2014 |
| WO | 2014/078854 A1 | 5/2014 |

OTHER PUBLICATIONS

EE Herald, "Devices to protect High brightness LED from ESD," dated Mar. 16, 2009, retrieved Jun. 10, 2011, retrieved from http://www.eeherald.com/section/new-products/np100779.html, 1 page.

Extended European Search Report, dated Aug. 13, 2014, for corresponding European Application No. 09826926.9, 8 pages.

Fairchild Semiconductor, "LED Application Design Guide Using Half-Bridge LLC Resonant Converter for 100W Street Lighting," AN-9729, Fairchild Semiconductor Corporation, Rev. 1.0.0, Mar. 22, 2011, 17 pages.

Huang, "Designing an LLC Resonant Half-Bridge Power Converter," 2010 Texas Instruments Power Supply Design Seminar, SEM1900, Topic 3, TI Literature Number: SLUP263, Copyright 2010, 2011, Texas Instruments Incorporated, 28 pages.

International Search Report, mailed Jul. 9, 2009, for PCT/US2009/043171, 5 pages.

International Search Report, mailed Jun. 21, 2010, for PCT/US2009/064625, 3 pages.

International Search Report, mailed Dec. 13, 2010, for PCT/US2010/035649, 3 pages.

International Search Report, mailed Dec. 15, 2010, for PCT/US2010/035658, 3 pages.

International Search Report, mailed Dec. 28, 2010, for PCT/US2010/035651, 3 pages.

International Search Report, mailed Sep. 30, 2011, for PCT/US2011/021359, 3 pages.

International Search Report, mailed Oct. 8, 2012, for PCT/US2012/033059, 3 pages.

International Search Report, mailed Jan. 14, 2013, for PCT/US2012/052009, 3 pages.

International Search Report, mailed Feb. 27, 2013, for PCT/US2012/065476, 3 pages.

International Search Report, mailed Nov. 19, 2013, for PCT/US2013/052092, 4 pages.

International Search Report, mailed Dec. 30, 2013, for PCT/US2013/058266, 3 pages.

International Search Report, mailed Feb. 26, 2014, for PCT/US2013/070794, 3 pages.

International Search Report mailed Nov. 11, 2014, for International Application No. PCT/US2014/047867, 3 pages.

Japanese Office Action, dated Jan. 6, 2015, for corresponding Japanese Application No. 2011-536564, 6 pages.

Kadirvel et al., "Self-Powered, Ambient Light Sensor Using bq25504," Texas Instruments, Application Report, SLUA629—Jan. 2012, 6 pages.

Littelfuse, "Application Note: Protecting LEDs in Product Designs," 2009, 2 pages.

Panasonic Electronic Components, "LED Lighting Solutions," 2009, 6 pages.

Poplawski, "Exploring Flicker & LEDs," 2010 DOE SSL Market Introduction Workshop, U.S. Department of Energy, Jul. 22, 2010, 16 pages.

Reed et al., "Adjustable Output Solid-State Lamp With Security Features," U.S. Appl. No. 61/561,616, filed Nov. 18, 2011, 33 pages.

Reed et al., "Adjustable Output Solid-State Lamp With Security Features," Office Action mailed Feb. 27, 2014, for U.S. Appl. No. 13/679,687, 11 pages.

Reed et al., "Adjustable Output Solid-State Lamp With Security Features," Amendment filed Jun. 24, 2014, for U.S. Appl. No. 13/679,687, 11 pages.

Reed et al., "Adjustable Output Solid-State Lamp With Security Features," Notice of Allowance mailed Aug. 29, 2014, for U.S. Appl. No. 13/679,687, 9 pages.

Reed et al., "Apparatus and Method for Schedule Based Operation of a Luminaire," Office Action mailed Mar. 26, 2014, for U.S. Appl. No. 13/604,327, 10 pages.

Reed et al., "Apparatus and Method for Schedule Based Operation of a Luminaire," Amendment filed Jun. 24, 2014, for U.S. Appl. No. 13/604,327, 14 pages.

Reed et al., "Apparatus and Method for Schedule Based Operation of a Luminaire," Notice of Allowance mailed Jul. 7, 2014, for U.S. Appl. No. 13/604,327, 8 pages.

Reed et al., "Apparatus and Method for Schedule Based Operation of a Luminaire" Office Action mailed Mar. 2, 2015, for U.S. Appl. No. 14/552,274, 7 pages.

(56) References Cited

OTHER PUBLICATIONS

Reed et al., "Apparatus and Method of Operating a Luminaire," Office Action mailed Dec. 22, 2014, for U.S. Appl. No. 13/558,191, 17 pages.
Reed et al., "Apparatus and Method of Operating a Luminaire," Amendment filed Mar. 19, 2015, for U.S. Appl. No. 13/558,191, 20 pages.
Reed et al., "Apparatus, Method to Change Light Source Color Temperature With Reduced Optical Filtering Losses," U.S. Appl. No. 61/295,519, filed Jan. 15, 2010, 35 pages.
Reed et al., "Apparatus, Method to Change Light Source Color Temperature With Reduced Optical Filtering Losses," U.S. Appl. No. 61/406,490, filed Oct. 25, 2010, 46 pages.
Reed et al., "Apparatus, Method to Enhance Color Contrast in Phosphor-Based Solid State Lights," U.S. Appl. No. 61/534,722, filed Sep. 14, 2011, 53 pages.
Reed et al., "Electrically Isolated Heat Sink for Solid-State Light," U.S. Appl. No. 61/229,435, filed Jul. 29, 2009, 29 pages.
Reed et al., "Gas-Discharge Lamp Replacement," U.S. Appl. No. 61/052,924, filed May 13, 2008, 32 pages.
Reed et al., "Gas-Discharge Lamp Replacement With Passive Cooling," U.S. Appl. No. 61/174,913, filed May 1, 2009, 29 pages.
Reed et al., "Long-Range Motion Detection for Illumination Control," U.S. Appl. No. 61/180,017, filed May 20, 2009, 32 pages.
Reed et al., "Long-Range Motion Detection for Illumination Control," Office Action mailed Dec. 21, 2012, for U.S. Appl. No. 12/784,080, 26 pages.
Reed et al., "Long-Range Motion Detection for Illumination Control," Amendment filed Apr. 22, 2013, for U.S. Appl. No. 12/784,080, 17 pages.
Reed et al., "Long-Range Motion Detection for Illumination Control," Office Action mailed Jul. 22, 2013, for U.S. Appl. No. 12/784,080, 29 pages.
Reed et al., "Long-Range Motion Detection for Illumination Control," Amendment filed Sep. 27, 2013, for U.S. Appl. No. 12/784,080, 20 pages.
Reed et al., "Long-Range Motion Detection for Illumination Control," Office Action mailed Jan. 30, 2014, for U.S. Appl. No. 12/784,080, 26 pages.
Reed et al., "Long-Range Motion Detection for Illumination Control," Amendment filed Apr. 28, 2014, for U.S. Appl. No. 12/784,080, 20 pages.
Reed et al., "Long-Range Motion Detection for Illumination Control," Notice of Allowance mailed Jun. 20, 2014, for U.S. Appl. No. 12/784,080, 7 pages.
Reed et al., "Low-Profile Pathway Illumination System," U.S. Appl. No. 61/051,619, filed May 8, 2008, 25 pages.
Reed et al., "Low-Profile Pathway Illumination System," Office Action, dated May 5, 2011, for U.S. Appl. No. 12/437,472, 24 pages.
Reed et al., "Low-Profile Pathway Illumination System," Amendment filed Jul. 29, 2011, for U.S. Appl. No. 12/437,472, 19 pages.
Reed et al., "Low-Profile Pathway Illumination System," Notice of Allowance, dated Oct. 14, 2011, for U.S. Appl. No. 12/437,472, 9 pages.
Reed et al., "Remotely Adjustable Solid-State Lamp," U.S. Appl. No. 61/641,781, filed May 2, 2012, 65 pages.
Reed et al., "Systems and Methods That Employ Object Recognition," Office Action mailed Aug. 25, 2014, for U.S. Appl. No. 13/411,321, 35 pages.
Reed et al., "Systems and Methods That Employ Object Recognition," Amendment filed Nov. 21, 2014, for U.S. Appl. No. 13/411,321, 20 pages.
Reed et al., "Systems and Methods That Employ Object Recognition," Office Action mailed Feb. 9, 2015, for U.S. Appl. No. 13/411,321, 40 pages.
Reed et al., "Turbulent Flow Cooling for Electronic Ballast," U.S. Appl. No. 61/088,651, filed Aug. 13, 2008, 23 pages.
Reed, "Adjustable Output Solid-State Lighting Device," U.S. Appl. No. 61/567,308, filed Dec. 6, 2011, 49 pages.
Reed, "Adjustable Output Solid-State Lighting Device," Office Acton mailed Jan. 2, 2015, for U.S. Appl. No. 13/707,123, 24 pages.
Reed, "Adjustable Output Solid-State Lighting Device," Amendment filed Apr. 2, 2015, for U.S. Appl. No. 13/707,123, 14 pages.
Reed, "Ambient Light Control in Solid State Lamps and Luminaires," U.S. Appl. No. 61/933,733, filed Jan. 30, 2014, 8 pages.
Reed, "Apparatus and Method of Energy Efficient Illumination," U.S. Appl. No. 61/333,983, filed May 12, 2010, 57 pages.
Reed, "Apparatus and Method of Energy Efficient Illumination," Office Action mailed Dec. 5, 2012, for U.S. Appl. No. 12/784,091, 18 pages.
Reed, "Apparatus and Method of Energy Efficient Illumination," Amendment filed Apr. 4, 2013, for U.S. Appl. No. 12/784,091, 15 pages.
Reed, "Apparatus and Method of Energy Efficient Illumination," Office Action mailed Apr. 24, 2013, for U.S. Appl. No. 12/784,091, 12 pages.
Reed, "Apparatus and Method of Energy Efficient Illumination," Amendment filed May 14, 2013, for U.S. Appl. No. 12/784,091, 9 pages.
Reed, "Apparatus and Method of Energy Efficient Illumination," Notice of Allowance mailed May 23, 2013, for U.S. Appl. No. 12/784,091, 6 pages.
Reed, "Apparatus and Method of Energy Efficient Illumination," U.S. Appl. No. 61/346,263, filed May 19, 2010, 67 pages.
Reed, "Apparatus and Method of Energy Efficient Illumination," Office Action mailed Dec. 5, 2012, for U.S. Appl. No. 12/784,093, 13 pages.
Reed, "Apparatus and Method of Energy Efficient Illumination," Amendment filed Apr. 2, 2013, for U.S. Appl. No. 12/784,093, 13 pages.
Reed, "Apparatus and Method of Energy Efficient Illumination," Notice of Allowance mailed Apr. 12, 2013, for U.S. Appl. No. 12/784,093, 9 pages.
Reed, "Apparatus and Method of Energy Efficient Illumination," Office Action mailed Nov. 27, 2013, for U.S. Appl. No. 13/943,537, 8 pages.
Reed, "Apparatus and Method of Energy Efficient Illumination," Notice of Allowance mailed Apr. 11, 2014, for U.S. Appl. No. 13/943,537, 9 pages.
Reed, "Apparatus and Method of Energy Efficient Illumination," Office Action mailed Aug. 28, 2014, for U.S. Appl. No. 14/329,508, 8 pages.
Reed, "Apparatus and Method of Energy Efficient Illumination," Amendment filed Sep. 30, 2014, for U.S. Appl. No. 14/329,508, 18 pages.
Reed, "Apparatus and Method of Energy Efficient Illumination," Notice of Allowance mailed Nov. 5, 2014, for U.S. Appl. No. 14/329,508, 10 pages.
Reed, "Apparatus and Method of Energy Efficient Illumination Using Received Signals," Office Action mailed Oct. 1, 2013, for U.S. Appl. No. 13/085,301, 11 pages.
Reed, "Apparatus and Method of Energy Efficient Illumination Using Received Signals," Amendment filed Jan. 2, 2014, for U.S. Appl. No. 13/085,301, 26 pages.
Reed, "Apparatus and Method of Energy Efficient Illumination Using Received Signals," Office Action mailed Apr. 23, 2014, for U.S. Appl. No. 13/085,301, 12 pages.
Reed, "Apparatus and Method of Energy Efficient Illumination Using Received Signals," Amendment filed Jul. 23, 2014, for U.S. Appl. No. 13/085,301, 12 pages.
Reed, "Apparatus and Method of Energy Efficient Illumination Using Received Signals," Notice of Allowance mailed Jul. 30, 2014, for U.S. Appl. No. 13/085,301, 5 pages.
Reed, "Electronic Control to Regulate Power for Solid-State Lighting and Methods Thereof," U.S. Appl. No. 61/115,438, filed Nov. 17, 2008, 51 pages.
Reed, "Electronic Control to Regulate Power for Solid-State Lighting and Methods Thereof," U.S. Appl. No. 61/154,619, filed Feb. 23, 2009, 62 pages.
Reed, "Electronic Control to Regulate Power for Solid-State Lighting and Methods Thereof," Office Action mailed Feb. 28, 2013, for U.S. Appl. No. 12/619,535, 17 pages.

(56) References Cited

OTHER PUBLICATIONS

Reed, "Electronic Control to Regulate Power for Solid-State Lighting and Methods Thereof," Amendment filed May 24, 2013, for U.S. Appl. No. 12/619,535, 21 pages.
Reed, "Electronic Control to Regulate Power for Solid-State Lighting and Methods Thereof," Office Action mailed Jul. 30, 2013, for U.S. Appl. No. 12/619,535, 15 pages.
Reed, "Electronic Control to Regulate Power for Solid-State Lighting and Methods Thereof," Amendment filed Oct. 30, 2013, for U.S. Appl. No. 12/619,535, 5 pages.
Reed, "Electronic Control to Regulate Power for Solid-State Lighting and Methods Thereof," Office Action mailed Mar. 26, 2014, for U.S. Appl. No. 12/619,535, 16 pages.
Reed, "Electronic Control to Regulate Power for Solid-State Lighting and Methods Thereof," Amendment filed May 27, 2014, for U.S. Appl. No. 12/619,535, 22 pages.
Reed, "Electronic Control to Regulate Power for Solid-State Lighting and Methods Thereof," Office Action mailed Aug. 14, 2014, for U.S. Appl. No. 12/619,535, 16 pages.
Reed, "Electronic Control to Regulate Power for Solid-State Lighting and Methods Thereof," Amendment filed Dec. 15, 2014, for U.S. Appl. No. 12/619,535, 21 pages.
Reed, "Electrostatic Discharge Protection for Luminaire," Office Action mailed Mar. 15, 2013, for U.S. Appl. No. 13/212,074, 11 pages.
Reed, "Electrostatic Discharge Protection for Luminaire," Amendment filed Jun. 17, 2013, for U.S. Appl. No. 13/212,074, 11 pages.
Reed, "Electrostatic Discharge Protection for Luminaire," Notice of Allowance mailed Sep. 12, 2013, for U.S. Appl. No. 13/212,074, 6 pages.
Reed, "High Efficiency Power Controller for Luminaire," U.S. Appl. No. 61/905,699, filed Nov. 18, 2013, 5 pages.
Reed, "High Efficiency Power Controller for Luminaire," U.S. Appl. No. 14/546,354, filed Nov. 18, 2014, 33 pages.
Reed, "Low Power Photocontrol for Luminaire," U.S. Appl. No. 62/137,666, filed Mar. 24, 2015, 36 pages.
Reed, "Luminaire With Adjustable Illumination Pattern," U.S. Appl. No. 62/114,826, filed Feb. 11, 2015, 68 pages.
Reed, "Luminaire With Ambient Sensing and Autonomous Control Capabilities," U.S. Appl. No. 61/728,150, filed Nov. 19, 2012, 83 pages.
Reed, "Luminaire With Ambient Sensing and Autonomous Control Capabilities," Office Action mailed Dec. 17, 2014, for U.S. Appl. No. 13/786,332, 20 pages.
Reed, "Luminaire With Ambient Sensing and Autonomous Control Capabilities," Amendment filed Mar. 13, 2015, for U.S. Appl. No. 13/786,332, 23 pages.
Reed, "Luminaire With Atmospheric Electrical Activity Detection and Visual Alert Capabilities," U.S. Appl. No. 61/694,159, filed Aug. 28, 2012, 52 pages.
Reed, "Luminaire With Atmospheric Electrical Activity Detection and Visual Alert Capabilities," Notice of Allowance mailed Jul. 1, 2014, for U.S. Appl. No. 13/786,114, 9 pages.
Reed, "Luminaire With Switch-Mode Converter Power Monitoring," U.S. Appl. No. 61/723,675, filed Nov. 7, 2012, 73 pages.
Reed, "Photocontrol for Luminaire Consumes Very Low Power," U.S. Appl. No. 61/849,841, filed Jul. 24, 2013, 41 pages.
Reed, "Photocontrol for Luminaire Consumes Very Low Power," U.S. Appl. No. 14/158,630, filed Jan. 17, 2014, 71 pages.
Reed, "Resonant Network for Reduction of Flicker Perception in Solid State Lighting Systems," U.S. Appl. No. 61/527,029, filed Aug. 24, 2011, 41 pages.
Reed, "Solid State Hospitality Lamp," U.S. Appl. No. 61/692,619, filed Aug. 23, 2012, 32 pages.
Reed, "Solid State Lighting, Drive Circuit and Method of Driving Same," U.S. Appl. No. 61/640,963, filed May 1, 2012, 24 pages.
Reed, "Systems, Methods, and Apparatuses for Using a High Current Switching Device as a Logic Level Sensor," U.S. Appl. No. 61/764,395, filed Feb. 13, 2013, 48 pages.
Renesas Electronics, "Zener Diodes for Surge Absorption—Applications of high-intensity LED," Apr. 2010, 1 page.
Renn et al., "Solid State Lighting Device and Method Employing Heat Exchanger Thermally Coupled Circuit Board," U.S. Appl. No. 61/357,421, filed Jun. 22, 2010, 49 pages.
Tyco Electronics, "Circuit Protection," retrieved Jun. 10, 2011, retrieved from http://www.tycoelectronics.com/en/products/circuit-protection.html, 2 pages.
Written Opinion, mailed Jul. 9, 2009 for PCT/US2009/043171, 8 pages.
Written Opinion, mailed Jun. 21, 2010 for PCT/US2009/064625, 5 pages.
Written Opinion, mailed Dec. 13, 2010 for PCT/US2010/035649, 4 pages.
Written Opinion, mailed Dec. 15, 2010 for PCT/US2010/035658, 3 pages.
Written Opinion, mailed Dec. 28, 2010 for PCT/US2010/035651, 3 pages.
Written Opinion, mailed Sep. 30, 2011 for PCT/US2011/021359, 4 pages.
Written Opinion, mailed Oct. 8, 2012 for PCT/US2012/033059, 3 pages.
Written Opinion, mailed Jan. 14, 2013 for PCT/US2012/052009, 5 pages.
Written Opinion, mailed Feb. 27, 2013, for PCT/US2012/065476, 8 pages.
Written Opinion, mailed Nov. 19, 2013 for PCT/US2013/052092, 7 pages.
Written Opinion, mailed Dec. 30, 2013 for PCT/US2013/058266, 8 pages.
Written Opinion, mailed Feb. 26, 2014, for PCT/US2013/070794, 10 pages.
Written Opinion mailed Nov. 11, 2014, for International Application No. PCT/US2014/047867, 5 pages.

* cited by examiner

AMBIENT LIGHT CONTROL IN SOLID STATE LAMPS AND LUMINAIRES

BACKGROUND

1. Technical Field

The present disclosure generally relates to the field of illumination devices and, more particularly, to ambient light controls used with luminaires to control dusk-to-dawn illumination.

2. Description of the Related Art

Energy conservation has become of ever increasing importance. Efficient use of energy can result in a variety of benefits, including financial benefits such as cost savings and environmental benefits such as preservation of natural resources and reduction in "green house" (e.g., $CO_2$) gas emissions.

Residential, commercial, and street lighting which illuminate interior and exterior spaces consume a significant amount of energy. Conventional lighting devices or luminaires exist in a broad range of designs, suitable for various uses. Lighting devices employ a variety of conventional light sources, for example incandescent lamps, fluorescent lamps such as high-intensity discharge (HID) lamps (e.g., mercury vapor lamps, high-pressure sodium lamps, metal halide lamps).

There appear to be two primary approaches to reducing energy consumption associated with lighting systems. One approach employs higher efficiency light sources. The other approach selectively provides light only when needed.

Use of higher efficiency light sources may, for instance, include replacing incandescent lamps with fluorescent lamps or even with solid-state light sources (e.g., light emitting diodes (LEDs), organic LEDs (OLEDs), polymer LEDs (PLEDs)) to increase energy efficiency. In some instances, these higher efficiency light sources may present a number of problems. For example, fluorescent light sources take a relatively long time after being turned ON to achieve their full rated level of output light or illumination. Such light sources also typically have a high energy consumption during warm-up. Many higher efficiency light sources emit light with a low color rendering index (CRI). For reference, sunlight has a CRI of 100 and represents "ideal light" which contains a continuous spectrum of visible radiation. Low CRI light is less pleasing to the human eye. Surfaces illuminate with low CRI light may not be perceived in their "true" color. Low CRI light makes it more difficult to discern details, often requiring a higher level of output light or illumination to discern details that would otherwise be discernable in high CRI light. Further, higher efficiency light sources may require additional circuitry (e.g., ballasts) and/or thermal management techniques (e.g., passive or active cooling).

Providing illumination only when needed can be achieved manually by a user of the lighting system, or automatically through the use of one or more control mechanisms. Automatic control mechanisms generally fall into two broad categories, timers and environmental sensors. Timer based control mechanisms turn light sources ON and OFF based on time. The times are typically user configurable. Such relies on the user to account for changes in length of daylight which may occur throughout a year. Very often, timer based control mechanisms are set once and never updated. Environmental sensor based control mechanisms sense light or illumination level and/or motion or proximity. Light or illumination level based control mechanisms are commonly referred to dusk-to-dawn sensors. Dusk-to-dawn light or illumination level based control mechanisms turn the light sources ON when a level of light or illumination in an environment falls below a turn ON threshold, and turn the light sources OFF when the level of light or illumination exceeds a turn OFF threshold. Light or illumination level based control mechanisms advantageously automatically accommodate changes in length of daylight throughout the year. However, such control mechanisms typically employ fixed turn ON and turn OFF thresholds (e.g., 10 Lux and 30 Lux, respectively). Since the particular application or location of the luminaire is not known, the manufacturer sets the turn ON and turn OFF thresholds to accommodate a wide range of conditions. Thus, the thresholds may be set too low for applications or locations with a high volume of artificial light. Likewise, thresholds may be set too high for applications or locations with no or relatively little artificial light. Such may cause the light source(s) to be turned ON prematurely or turned OFF later than would otherwise be possible, resulting in less efficiency than might otherwise be possible. Such may also cause the light source(s) to be turned ON late or turned OFF prematurely, failing to provide adequate light when needed. Even changes in natural ambient light may cause the thresholds to be incorrect. For example, snow may reflect sufficient light to prevent the light source(s) from being turned ON.

Motion or proximity based control mechanisms (e.g., passive infrared sensor based mechanisms) turn light sources ON when motion or proximity is detected. Motion or proximity based control mechanisms turn light sources OFF after some period of time if no motion or proximity is detected during that period of time. Sensitivity of such motion or proximity based control mechanisms is typically user configurable, as is the duration between turn ON and turn OFF. However, motion or proximity based control mechanisms have limited range (e.g., 10 meters), limiting the number of applications in which such may be effectively employed. Motion or proximity based control mechanisms may also be ineffective where the ambient air temperature or temperature of an object is close to that of the trigger temperature (e.g., temperature of human body). Some lighting control mechanisms employ both light or illumination level based and motion or proximity based techniques. Such lighting control mechanisms turn light sources ON only if motion is detected while the level of light or illumination in the environment is below the turn ON threshold. Thus, the motion or proximity sensing is active only between dusk and dawn.

In addition, a failure of the automatic control mechanism, for example failure of a photosensitive transducer used to turn the light source ON or OFF dependent upon the measured ambient light level may result in the light source remaining in a continuously ON state in the event the automatic control mechanism fails in a "closed" position permitting current flow to the light source or in a continuously OFF state in the event the automatic control mechanism fails in an "open" position interrupting current flow to the light source. Either failure mode results in an unacceptable mode of operation of the light source.

Sometimes these approaches are incompatible with each other. For example, the relatively "warm up" long time required for high intensity discharge light sources to produce full output hinders the effective use of such light sources with motion or proximity based control mechanisms. Typically, high intensity discharge light sources cannot be dimmed. While some dimmable compact fluorescent light sources have recently become available, such exhibit poor power factors. Further, many control mechanisms are built into the luminaire. Such makes it difficult or even impossible to modify operation of the control mechanism beyond some simple user settings (e.g., sensitivity, duration between turn ON and turn OFF).

BRIEF SUMMARY

A method may be summarized as including: providing a luminaire including: a cover having a light transmissive portion at least partially formed from a light transmissive material; a solid-state light source disposed within the cover, the solid-state light source having an illumination path that passes through at least a portion of the light transmissive portion, the solid-state light source operative in an OFF state in which no light is produced and an ON state in which at least some light is produced; and a photosensitive transducer disposed within the cover, the photosensitive transducer having a detection path that passes through at least a portion of the light transmissive portion and at least partially overlaps with the illumination path of the solid-state light source, the photosensitive transducer operative to provide photosensitive transducer signals each indicative of a light level of the detection path at a respective sampling time; alternatingly operating the luminaire in a daytime mode wherein the solid-state light source is in the OFF state and a nighttime mode wherein the solid-state light source produces at least some light in the illumination path, operating the luminaire in the daytime mode may include: from time to time obtaining a photosensitive transducer signal from the photosensitive transducer; analyzing a plurality of the obtained photosensitive transducer signals to determine the presence of a turn ON condition; and in response to determining the presence of the turn ON condition, controlling the solid-state light source to be in the ON state and transitioning the luminaire from the daytime mode to the nighttime mode; wherein operating the luminaire in the nighttime mode may include: from time to time controlling the solid-state light source to be in the OFF state for an OFF period that is imperceptible to a human; obtaining a photosensitive transducer signal having a sampling time that occurs during the OFF period while the solid-state light source is in the OFF state; analyzing a plurality of the obtained photosensitive transducer signals to determine the presence of a turn OFF condition; and in response to determining the presence of the turn OFF condition, controlling the solid-state light source to be in the OFF state and transitioning the luminaire from the nighttime mode to the daytime mode.

The light transmissive portion of the cover may be translucent and may diffuse at least some light passing therethrough. The light transmissive portion of the cover may be transparent. Analyzing a plurality of the obtained photosensitive transducer signals to determine the presence of a turn ON condition may include comparing the plurality of the obtained photosensitive transducer signals to a turn ON threshold value. Analyzing a plurality of the obtained photosensitive transducer signals to determine the presence of a turn ON condition may include determining whether a number N of the plurality of the obtained photosensitive transducer signals are below the turn ON threshold value. Analyzing a plurality of the obtained photosensitive transducer signals to determine the presence of a turn ON condition may include determining whether the plurality of the obtained photosensitive transducer signals have been below the turn ON threshold value for a determined time period. Analyzing a plurality of the obtained photosensitive transducer signals to determine the presence of a turn OFF condition may include comparing the plurality of the obtained photosensitive transducer signals to a turn OFF threshold value. Analyzing a plurality of the obtained photosensitive transducer signals to determine the presence of a turn OFF condition may include determining whether a number N of the plurality of the obtained photosensitive transducer signals are above the turn OFF threshold value. Analyzing a plurality of the obtained photosensitive transducer signals to determine the presence of a turn OFF condition may include determining whether the plurality of the obtained photosensitive transducer signals have been above the turn OFF threshold value for a determined time period. Analyzing a plurality of the obtained photosensitive transducer signals to determine the presence of a turn ON condition may include comparing the plurality of the obtained photosensitive transducer signals to a turn ON threshold value, and analyzing a plurality of the obtained photosensitive transducer signals to determine the presence of a turn OFF condition may include comparing the plurality of the obtained photosensitive transducer signals to a turn OFF threshold value. The turn ON threshold value may be different than the turn OFF threshold value. The turn ON threshold value may be less than the turn OFF threshold value. The turn ON threshold value and the turn OFF threshold value may be dependent on at least one physical characteristic of the light transmissive portion of the cover. Obtaining a photosensitive transducer signal having a sampling time that occurs during the OFF period while the solid-state light source is in the OFF state may include obtaining a photosensitive transducer signal having a sampling time that is a settling time delay after initiation of the controlling of the solid-state light source to be in the OFF state for the OFF period. The settling time delay may be less than or equal to 150 microseconds. The OFF period may be less than or equal to two milliseconds. The OFF period may be less than or equal to 250 microseconds. Controlling the solid-state light source may include controlling a current through a solid-state power switch coupled to the solid-state light source. Controlling the solid-state light source may include providing a control signal to a control input of a light source driver of the solid-state light source. The method may further include: in response to determining the presence of the turn ON condition, obtaining a current time and a current date; associating the current time and the current date with a dusk event; storing the associated current time, current date and dusk event in a non-transitory storage medium; in response to determining the presence of the turn OFF condition, obtaining a current time and a current date; associating the current time and the current date with a dawn event; and storing the associated current time, current date and dawn event in the non-transitory storage medium. The method may further include: verifying whether at least one of the plurality of obtained photosensitive transducer signals is within an expected range of values; and controlling the operation of the solid-state light source according to a schedule if not verified. The expected range of values may be dependent on at least one of a current time and a current date. The method may further include: in response to determining the presence of one of the turn ON condition and the turn OFF condition, obtaining a current time; verifying whether the current time for the one of the turn ON condition and the turn OFF condition is within an expected range of turn ON condition times or turn OFF condition times, respectively; and controlling the operation of the solid-state light source according to a schedule if not verified. The schedule may include a plurality of daily turn ON times and a plurality of turn OFF times stored in a non-transitory storage medium, and may further include: in response to determining the presence of the turn ON condition, obtaining a current time and a current date; associating the current time with a turn ON time for the current date; storing the turn ON time for the current date in the non-transitory storage medium; in response to determining the presence of the turn OFF condition, obtaining a current time and a current date; associating the current time with a turn OFF time for the current date; and storing the turn OFF time for the current date in the non-transitory storage medium. The method may further include obtaining data indicative of the schedule from an external device and storing the data in a non-transitory storage medium.

A method of operating a luminaire including a photosensitive transducer and a solid-state light source, the photosensitive transducer being physically oriented to detect light within an illumination path of the light source may be summarized as including: controlling the light source to be in an ON state in which at least some light is produced; controlling the light source to be in an OFF state in which no light is produced for an OFF period before controlling the light source to return to the ON state, the OFF period being sufficiently short in duration such that the light source being in the OFF state for the OFF period is imperceptible to a human; obtaining at least one first value from the photosensitive transducer, the at least one first value corresponding to an ambient light level measurement of the illumination path taken while the light source is in the OFF state for the OFF period; determining whether the at least one first value is greater than or equal to a dawn threshold value; and controlling the light source to be in one of the ON state and the OFF state depending on the determining of whether the at least one first value is greater than or equal to the dawn threshold value.

The at least one first value from the photosensitive transducer may correspond to an ambient light level measurement of the illumination path at a time at least a settling time delay after initiating the controlling of the light source to be in the OFF state. The settling time delay may be less than or equal to 150 microseconds. The OFF period may be less than or equal to two milliseconds. The method may further include: responsive to determining that the at least one first value is greater than or equal to the dawn threshold value, obtaining a current time and a range of times; determining whether the current time is within the range of times; and responsive to determining that the current time is not within the range of times, signaling an alarm condition. Obtaining the range of times may include wirelessly receiving the range of times from an external device. Obtaining the range of times may include obtaining at least one time associated with at least one value previously obtained from the photosensitive transducer. The method may further include: responsive to determining that the at least one first value is greater than or equal to the dawn threshold value, obtaining a current time; logically associating the current time with a transition from nighttime to daytime for a current day; and storing the logical association in a non-transitory storage medium. The method may further include: receiving at least one threshold change indication; and responsive to receiving the at least one threshold change indication, changing the dawn threshold value based on the least one threshold change indication. The controlling of the light source to be in the ON state may include outputting a signal to a transistor that causes the transistor to be in an electrically continuous state, and the controlling of the light source to be in the OFF state may include outputting a signal to the transistor that causes the transistor to be in an electrically discontinuous state. The controlling of the light source to be in the ON state may include outputting a logic level signal to a light source driver that causes the light source driver to provide power to the light source, and the controlling of the light source to be in the OFF state may include outputting a logic level signal to the light source driver that causes the light source driver to not provide power to the light source.

Controlling the light source to be in one of the ON state and the OFF state depending on the determining of whether the at least one first value is greater than or equal to the dawn threshold value may include controlling the light source to be in the OFF state after determining that the at least one first value is greater than or equal to the dawn threshold value for a determined amount of time. The method may further include: controlling the light source to be in the OFF state; obtaining at least one second value from the photosensitive transducer corresponding to an ambient light level of the illumination path; determining whether the at least one second value is less than or equal to a dusk threshold value; and controlling the light source to be in one of the ON state and the OFF state depending on the determining of whether the at least one second value is less than or equal to the dusk threshold value. The dawn threshold value may be equal to the dusk threshold value. The dawn threshold value may be different from the dusk threshold value. Controlling the light source to be in one of the ON state and the OFF state depending on the determining of whether the at least one second value is less than or equal to the dusk threshold value may include controlling the light source to be in the ON state after determining that the at least one second value is less than or equal to the dusk threshold value for a determined amount of time. The method may further include: responsive to determining that the at least one first value is greater than or equal to the dawn threshold value, obtaining a current time and an expected range of times; determining whether the current time is within the expected range of times; and responsive to determining that the current time is not within the expected range of times, controlling the operation of the light source according to a schedule stored in a non-transitory storage medium.

A luminaire may be summarized as including: a cover having a light transmissive portion at least partially formed from a light transmissive material; a solid-state light source disposed within the cover, the solid-state light source having an illumination path that passes through at least a portion of the light transmissive portion, the solid-state light source operative in an OFF state in which no light is produced and an ON state in which at least some light is produced; a photosensitive transducer disposed within the cover, the photosensitive transducer having a detection path that passes through at least a portion of the light transmissive portion and at least partially overlaps with the illumination path of the solid-state light source, the photosensitive transducer operative to provide photosensitive transducer signals each indicative of a light level of the detection path at a respective sampling time; and a control subsystem communicatively coupled to the photosensitive transducer to receive the photosensitive transducer signals therefrom, and communicatively coupled to the solid-state light source to control the solid-state light source, the control subsystem including a processing unit and a non-transitory storage medium storing instructions that, when executed by the processing unit, cause the control subsystem to: alternatingly operate the luminaire in a daytime mode wherein the solid-state light source is in the OFF state and a nighttime mode wherein the solid-state light source produces at least some light in the illumination path, wherein, when the instructions cause the control subsystem to operate in the daytime mode, the instructions cause the control subsystem to: from time to time obtain a photosensitive transducer signal from the photosensitive transducer; analyze a plurality of the obtained photosensitive transducer signals to determine the presence of a turn ON condition; and when the presence of the turn ON condition is determined, control the solid-state light source to be in the ON state and transition the luminaire from the daytime mode to the nighttime mode; wherein, when the instructions cause the control subsystem to operate in the nighttime mode, the instructions cause the control subsystem to: from time to time control the solid-state light source to be in the OFF state for an OFF period that is imperceptible to a human; obtain a photosensitive transducer signal having a sampling time that occurs during the OFF period while the solid-state light source is in the OFF state; analyze a plurality of the obtained photosensitive transducer signals obtained during the OFF periods to determine the presence of a turn OFF condition; and when the presence of the turn OFF condition is determined, control the solid-state light source to be in the OFF state and transition the luminaire from the nighttime mode to the daytime mode.

The light transmissive portion of the cover may be translucent and diffuses at least some light passing therethrough. The light transmissive portion of the cover may be transparent. The instructions may cause the control subsystem to compare the plurality of the obtained photosensitive transducer signals to a turn ON threshold value. The instructions may cause the control subsystem to determine whether a number N of the plurality of the obtained photosensitive transducer signals are below the turn ON threshold value. The instructions may cause the control subsystem to determine whether the plurality of the obtained photosensitive transducer signals have been below the turn ON threshold value for a determined time period. The instructions may cause the control subsystem to compare the plurality of the obtained photosensitive transducer signals to a turn OFF threshold value. The instructions may cause the control subsystem to determine whether a number N of the plurality of the obtained photosensitive transducer signals are above the turn OFF threshold value. The instructions may cause the control subsystem to determine whether the plurality of the obtained photosensitive transducer signals have been above the turn OFF threshold value for a determined time period. The instructions may cause the control subsystem to compare the plurality of the obtained photosensitive transducer signals to a turn ON threshold value, and to compare the plurality of the obtained photosensitive transducer signals to a turn OFF threshold value. The turn ON threshold value may be different than the turn OFF threshold value. The turn ON threshold value may be less than the turn OFF threshold value. The turn ON threshold value and the turn OFF threshold value may be dependent on at least one physical characteristic of the light transmissive portion of the cover. The instructions may cause the control subsystem to obtain a photosensitive transducer signal having a sampling time that is a settling time delay after the beginning of the OFF period. The settling time delay may be less than or equal to 150 microseconds. The OFF period may be less than or equal to two milliseconds. The OFF period may be less than or equal to 250 microseconds. The luminaire may further include: a solid-state power switch coupled to the solid-state light source and the control subsystem, wherein the instructions cause the control subsystem to control a current through the solid-state power switch to control the operation of the solid-state light source. The luminaire may further include: a light source driver operatively coupled to the solid-state light source and having a control input, the control subsystem including a control output operatively coupled to the control input, wherein the instructions cause the control subsystem to control the operation of the solid-state light source via the control output. The instructions may cause the control subsystem to: when the presence of the turn ON condition is determined, obtain a current time and a current date; associate the current time and the current date with a dusk event; store the associated current time, current date and dusk event in the non-transitory storage medium; when the presence of the turn OFF condition is determined, obtaining a current time and a current date; associate the current time and the current date with a dawn event; and store the associated current time, current date and dawn event in the non-transitory storage medium. The instructions may cause the control subsystem to: verify whether at least one of the plurality of obtained photosensitive transducer signals is within an expected range of values; and control the operation of the solid-state light source according to a schedule if not verified. The expected range of values may be dependent on at least one of a current time and a current date. The instructions may cause the control subsystem to: when one of the turn ON condition and the turn OFF condition is determined to be present, obtain a current time; verify whether the current time for the one of the turn ON condition and the turn OFF condition is within an expected range of turn ON condition times or turn OFF condition times, respectively; and control the operation of the solid-state light source according to a schedule if not verified. The schedule may include a plurality of daily turn ON times and a plurality of turn OFF times stored in the non-transitory storage medium, and the instructions may cause the control subsystem to: when the presence of the turn ON condition is determined, obtain a current time and a current date; associate the current time with a turn ON time for the current date; store the turn ON time for the current date in the non-transitory storage medium; when the presence of the turn OFF condition is determined, obtain a current time and a current date; associate the current time with a turn OFF time for the current date; and store the turn OFF time for the current date in the non-transitory storage medium. The instructions may cause the control subsystem to obtain data indicative of the schedule from an external device and store the data in the non-transitory storage medium. When the instructions cause the control subsystem to operate in the nighttime mode, the instructions may cause the control subsystem to: from time to time at a rate greater than or equal to a sampling frequency: control the solid-state light source to be in the OFF state for the OFF period that is imperceptible to a human; and obtain a photosensitive transducer signal having a sampling time that occurs during the OFF period while the solid-state light source is in the OFF state. The sampling frequency may be equal to 24 samples per day. The sampling frequency may be equal to 4 samples per hour. The sampling frequency may be equal to 60 samples per hour. The sampling frequency may be equal to 60 samples per minute.

A luminaire may be summarized as including: at least one solid-state light source having an illumination path; at least one photosensitive transducer responsive to at least one physical characteristic indicative of at least one light condition, the at least one photosensitive transducer being physically oriented to detect light in the illumination path of the at least one solid-state light source; and a control subsystem communicatively coupled to the photosensitive transducer to receive photosensitive transducer signals indicative of the at least one light condition in the illumination path sensed by the photosensitive transducer, and communicatively coupled to the at least one solid-state light source to control the at least one solid-state light source to be in an OFF state in which no light is produced and an ON state in which at least some light is produced, the control subsystem including a processing unit and a non-transitory storage medium storing instructions that, when executed by the processing unit, cause the control subsystem to: control the at least one solid-state light source to be in the ON state responsive at least in part to the photosensitive transducer signals; control the at least one solid-state light source to be in the OFF state for an OFF period that is imperceptible to a human; obtain at least one of the photosensitive transducer signals, the at least one of the photosensitive transducer signals indicative of the at least one light condition in the illumination path sensed by the at least one photosensitive transducer during at least a portion of the OFF period while the at least one solid-state light source is in the OFF state; compare the at least one obtained photosensitive transducer signal to a first threshold value; and control the at least one solid-state light source to be in the OFF state responsive at least in part to comparing the at least one obtained photosensitive transducer signal to the first threshold value.

The instructions may cause the control subsystem to: subsequently from time to time control the at least one solid-state light source to be in the OFF state for the OFF period, and obtain at least one of the at least one photosensitive transducer signals, the at least one of the photosensitive transducer signals indicative of the at least one light condition in the illumination path sensed by the at least one photosensitive transducer during the OFF period; store a plurality of the obtained photosensitive transducer signals in the non-transitory storage medium; determine whether the plurality of obtained photosensitive transducer signals are above the first threshold value according to a turn OFF condition; and in response to determining that the obtained photosensitive transducer signals are above the first threshold value according to the turn OFF condition, control the at least one solid-state light source to be in the OFF state. The instructions may cause the control subsystem to: in response to determining that the plurality of photosensitive transducer signals are above the first threshold value according to the turn OFF condition, obtain a current time and a current date; associate the current time and the current date with a daily event; and store the associated current time, current date and daily event in the non-transitory storage medium. The turn OFF condition may include the plurality of obtained photosensitive transducer signals being above the first threshold value for a period of time. The turn OFF condition may include the plurality of obtained photosensitive transducer signals being above the first threshold value for a number N of photosensitive transducer signals. The luminaire may further include: a real time clock (RTC) communicably coupled to the control subsystem to provide an RTC signal to the control subsystem that is indicative of at least one of: a current date and a current time. The luminaire may further include: a communications interface to communicably couple the control subsystem to one or more external devices from which the control subsystem can obtain data indicative of at least one of: a software update, a firmware update, one or more executable instruction sets, data indicative of the current date, data indicative of the current time, data indicative of an approximate longitude of the luminaire, or data indicative of an approximate latitude of the luminaire. The control subsystem may further include at least one solid state power switch coupled to the at least one solid-state light source and operably controlled at least in part by the control subsystem. The control subsystem may be operatively coupled to a control input of a light source driver of the at least one solid-state light source. The OFF period may be less than or equal to two milliseconds. The OFF period may be less than or equal to 250 microseconds. The photosensitive transducer signal indicative of the at least one light condition in the illumination path may be sensed by the photosensitive transducer during the OFF period after waiting a settling time delay after the control subsystem controls the at least one solid-state light source to be in the OFF state. The settling time delay may be less than or equal to 150 microseconds. The instructions may cause the control subsystem to: receive at least one threshold change indication; and responsive to receiving the at least one threshold change indication, change the first threshold value based on the least one threshold change indication. The luminaire may further include: a switch electrically coupled to the light source and electrically coupled to the control subsystem, wherein the instructions cause the control subsystem to output a signal to the switch to control the light source. The luminaire may further include: a light source driver electrically coupled to the light source and electrically coupled to the control subsystem, wherein the instructions cause the control subsystem to output a signal to the light source driver to control the light source. The instructions may cause the control subsystem to: subsequently from time to time at a rate greater than or equal to a sampling frequency control the at least one solid-state light source to be in the OFF state for the OFF period, and obtain at least one of the at least one photosensitive transducer signals, the at least one of the photosensitive transducer signals indicative of the at least one light condition in the illumination path sensed by the at least one photosensitive transducer during the OFF period. The sampling frequency may be equal to 24 samples per day. The sampling frequency may be equal to 4 samples per hour. The sampling frequency may be equal to 60 samples per hour. The sampling frequency may be equal to 60 samples per minute.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with lighting systems, for example power converters, thermal management structures and subsystems, and/or solid-state lights have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used in the specification and the appended claims, references are made to a "node" or "nodes." It is understood that a node may be a pad, a pin, a junction, a connector, a wire, or any other point recognizable by one of ordinary skill in the art as being suitable for making an electrical connection within an integrated circuit, on a circuit board, in a chassis or the like.

The headings and Abstract of the Disclosure provided herein are for convenience only and do not interpret the scope or meaning of the embodiments.

Figure 1:
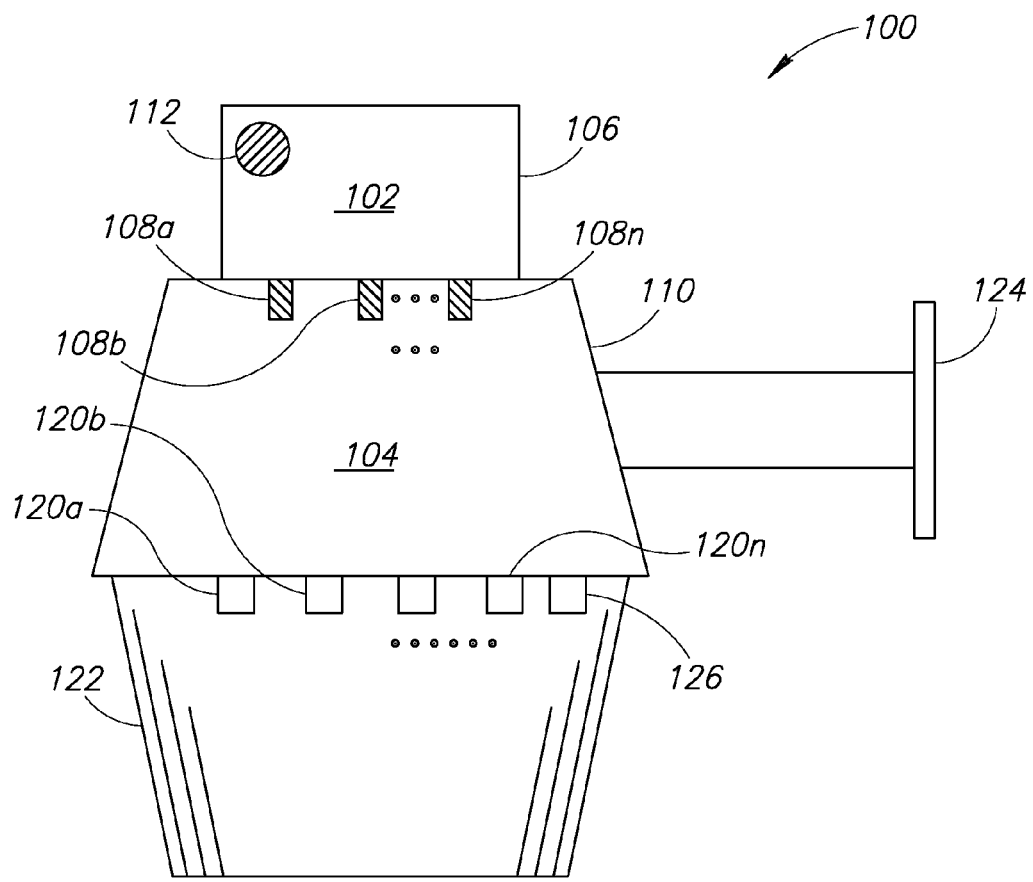
FIG. 1 is an elevation view showing a luminaire including a control subsystem and a lighting subsystem, according to one non-limiting illustrated embodiment.

FIG. 1 illustrates a luminaire 100 including a control subsystem 102 disposed within a housing 106 that is physically and electrically coupled to a lighting subsystem 104 via one or more circuits 108a-b (collectively 108). The lighting subsystem 104 can be at least partially disposed in a luminaire housing 110. One or more solid-state light sources 120a-n (collectively light source or light sources 120) can be partially or completely surrounded by the luminaire housing 110. A photosensitive transducer 126 may also be provided that is disposed in the same position and orientation in which light from the light sources 120 is emitted (e.g., within the illumination path or area of the light sources). In other words, the photosensitive transducer 126 has a detection path that at least partially overlaps with the illumination path of the light sources 120. As discussed in further detail below, the photosensitive transducer 126 may be used to obtain an ambient light level measurement during a brief period (e.g., one millisecond) when the light source 120 is in an OFF state to provide a measurement that is not affected by light emitted from the light source.

In at least some instances, all or a portion light provided by the one or more light sources 120 may pass through a cover 122 (e.g., lens, diffuser or similar shade) attached to the luminaire housing 110 when exiting the luminaire 100. Similarly, in at least some instances, all or a portion of light received by the photosensitive transducer 126 from the environment may first pass through the cover 122 attached to the luminaire housing 110 when entering the luminaire 100. By positioning the photosensitive transducer 126 behind a diffuser, the photosensitive transducer may realize the benefits of the diffuser in reverse. That is, the ambient light from many directions will be integrated onto the photosensitive transducer 126 via the diffuser so that an average ambient light level is detected. Since the cover 122 may impact the amount of ambient light ultimately imparted onto the photosensitive transducer 126, the photosensitive transducer may require calibration to accommodate the particular physical characteristics (e.g., translucence) of the cover. Further, by positioning the photosensitive transducer 126 behind the cover 122, the photosensitive transducer and its associated electronics may be sealed from the environment and thereby protected from rain, hail, insects, rodents, and other hazards that could cause malfunctions.

Although the control subsystem 102 and the lighting subsystem 104 are depicted as physically attached using a plug type electrical coupling circuit 108 in FIG. 1, at times the control subsystem 102 may be disposed in a location remote from the lighting subsystem 104, or may be integrated therewith. For example, in some embodiments the control subsystem 102 may be at least partially disposed within a housing 106 that is mounted on an exterior surface of a structure and the lighting subsystem 104 may be mounted inside the structure. When the control subsystem 102 is remotely mounted, one or more wired or wireless connections may be used to power the control subsystem 102 and to communicably couple the control subsystem 102 with the lighting subsystem 104. The photosensitive transducer 126 may be physically associated with the control subsystem 102, the lighting subsystem 104, neither subsystem, or both subsystems. The luminaire 100 can include one or more brackets 124 that permit the luminaire 100 to be suspended from or otherwise supported by a rigid structure such as that provided by a pole or building. The cover 122 may include a light transmissive portion (e.g., transparent or translucent) that lets at least some light pass therethrough. For example, the cover 122 may include a diffuser portion formed from a light transmissive plastic material. The cover 122 may also include an opaque portion.

The luminaire 100 may include wiring (not shown in FIG. 1) to supply power to the control subsystem 102 and the lighting subsystem 104 using an external electrical power source such as an electrical power grid. In some instances, the one or more light sources 120 may be formed into a replaceable component, for example a plurality of individual solid-state light sources or solid-state light source strings formed into a bulb or similar unitary structure that physically attaches and electrically couples to the lighting subsystem 104 using a threaded, plug, or bayonet-type socket mount. Alternatively, the one or more light sources 120 may be integral with the lighting subsystem 104, particularly where the lighting subsystem 104 includes a plurality of solid-state light emitters and associated driver circuit hardware which have a relatively long operational life.

The control subsystem 102 includes electrical circuitry or electronics that control or otherwise alter or adjust the power, luminosity, luminous output, or illumination state of the lighting subsystem 104, or control one or more functions of the luminaire 100. Such functions may include, but are not limited to adjusting or otherwise controlling the luminous output of the one or more light sources 120 in response to detected or expected ambient light levels.

The housing 106 can include any structure suitable for internally and/or externally accommodating all or a portion of the control subsystem 102. At times, the housing may be a metallic weatherproof enclosure (e.g., a National Electrical Manufacturers Association "NEMA" type 3, 3R, or 4 enclosure) or a corrosion resistant weatherproof enclosure (e.g., a NEMA 4X enclosure). At least a portion of the housing 106 may be substantially transparent to radio frequency (RF) or optical electromagnetic radiation. The housing 106 may include one or more features, such as one or more threaded fasteners, plugs, hooks and loops, or combinations thereof to facilitate the mechanical or physical attachment of the housing 106 to the luminaire housing 110 or other structure. In some instances, the electrical coupling circuit 108 can include a number of electrical contacts such as pads, prongs, spades, protrusions, or similar electrically conductive structures on at least a portion of the exterior surface of the housing 106. Such surface mount electrical connectors are particularly advantageous where the control subsystem 102 is fitted directly to the luminaire housing 110 during manufacture or where the control subsystem 102 is retrofitted to an existing luminaire housing 110 after installation. In other instances, the electrical coupling circuit 108 can include a number of cables, each having a number of conductors extending from the housing 106. Such remote mount electrical connectors are particularly useful where the control subsystem 102 is mounted in the field at a distance from the luminaire housing 110. In some instances, the control subsystem 102 and the lighting subsystem 104 are formed together in a single housing.

The one or more light sources 120 may take a variety of forms. The light source 120 may include one or more distinct light bulbs, lights or light emitters 120a-120n (only four called out in FIG. 1). For example, the one or more light sources 120 may take the form of one or more solid-state light sources, for instance an array of light emitting diodes (LEDs), organic light emitting diodes (OLEDs), or polymer light emitting diodes (PLEDs). The one or more light sources 120 do not necessarily have to be enclosed in a bulb structure. For example, the light sources may take the form of one-, two-, or even three-dimensional arrays of individual LEDs or strings of LEDs.

Light source configurations other than the individual luminaire shown in FIG. 1 may be used to equal effect. For example, the luminaire may include a plurality of directional light sources 120 mounted on a common base and operated using a common control subsystem 102. In another example, a plurality of luminaires 100 may be networked (i.e., communicably coupled) together and the luminous output of each of luminaires 100 in the network controlled as a group using a single control subsystem 102.

The photosensitive transducer 126 may be used to detect via ambient light measurement the occurrence of one or more solar events including a detected dawn event and a detected dusk event used to control the luminous output of the lighting subsystem 104. In at least some instances, the time of occurrence of various solar events (e.g., a sunrise event, a sunset event, a dusk event, a dawn event) can be determined using one or more lookup tables or other data structures containing data indicative of the times of occurrence for various solar events and stored in a non-transitory storage media accessible by the control subsystem 102. The time of occurrence of various solar events may additionally or alternatively be calculated using geolocation, time, or date data either generated by or stored within the control subsystem 102 or obtained from one or more external devices via one or more wired or wireless communication interfaces either in or communicably coupled to the control subsystem 102.

Figure 2:
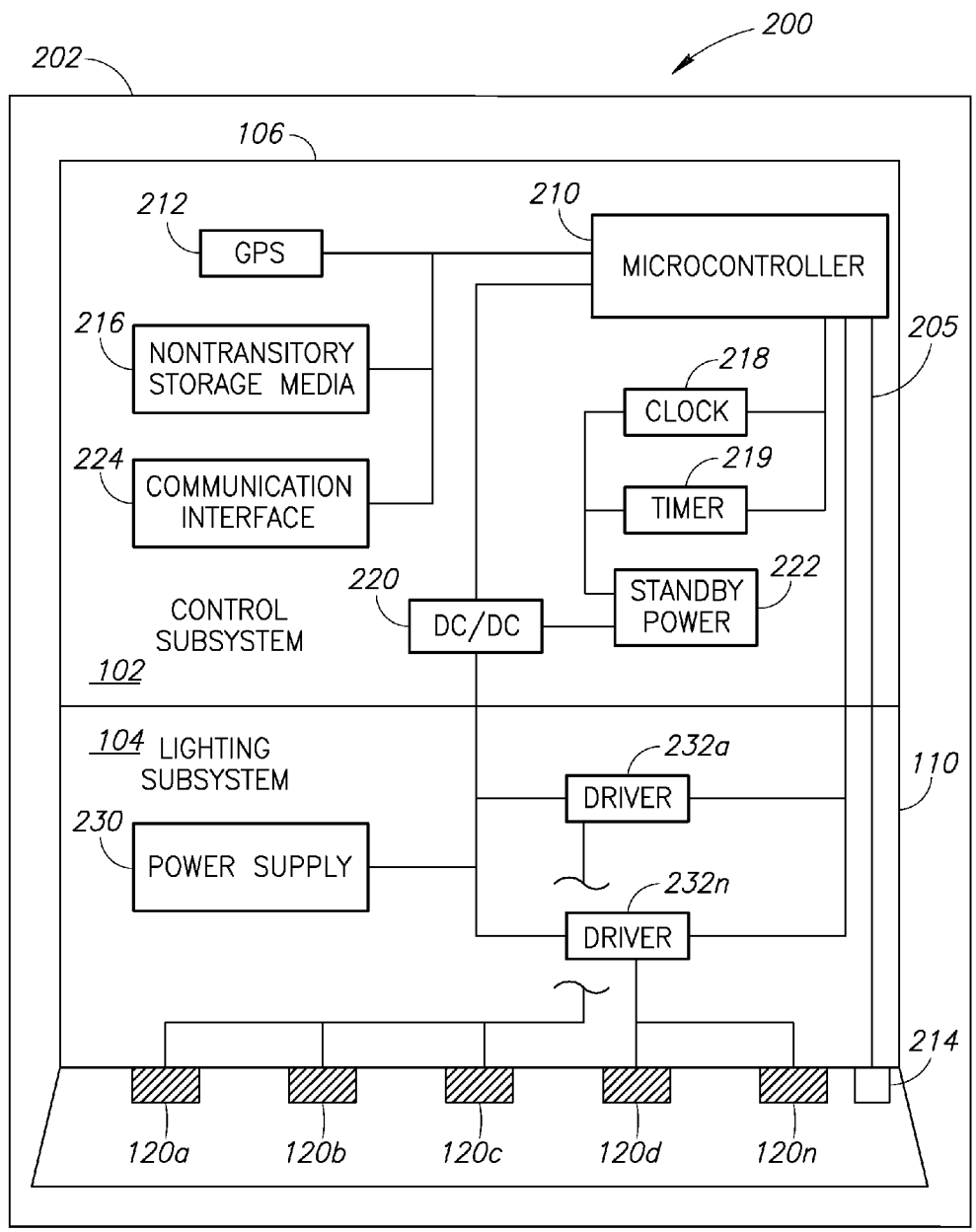
FIG. 2 is a schematic diagram showing a luminaire including a control subsystem and a lighting subsystem, according to one non-limiting illustrated embodiment.

FIG. 2 shows an illumination system 200 including a luminaire 202 with a control subsystem 102 and a lighting subsystem 104, according to one non-limiting illustrated embodiment. The illumination system 200 may be identical or similar to the illumination system 100 (FIG. 1) or may have a physical configuration that differs in form but is similar in function to the illumination system 100 illustrated in FIG. 1. The illumination system 200 may employ any number of light sources 120. In some instances, the illumination system 200 may include more than one luminaire 202.

The illumination system 200 includes the control subsystem 102 which may be a separate component that can be added post-manufacture, for instance in the form of a retrofit kit, to the luminaire 202 (e.g., by "plugging in" a modular control subsystem 102) or may be integral to the luminaire 202 (e.g., a control subsystem 102 that is hardwired to the lighting subsystem 104). Notably, the control subsystem 102 includes at least one microcontroller 210 and at least one photosensitive transducer 214 to sense the varying levels (e.g., power or intensity) of one or more light conditions in the ambient environment about the luminaire 202. The photosensitive transducer 214 may be the same as or similar to the photosensitive transducer 126 of FIG. 1. The photosensitive transducer 214 may be communicably coupled to the microcontroller 210. In general the control subsystem 102 may control one or more operational aspects of the lighting subsystem 104.

One or more aspects of the lighting subsystem 104 may be controlled at least in part by the microcontroller 210 based on the detected ambient light levels sensed by the photosensitive transducer 214. At other times, the lighting subsystem 104 may be controlled at least in part by the microcontroller 210 based on the expected occurrence of one or more solar events. At such times, the control subsystem 102 may calculate, retrieve, or otherwise determine the expected time of occurrence of a solar event using current time data, current date data, historical data, geolocation data (e.g., received via a global positioning system (GPS) receiver 212), and/or one or more analytical relationships.

The at least one microcontroller 210 may take any of a variety of forms, for example a microprocessor, programmable gate array (PGA), application specific integrated circuit (ASIC), digital signal processor (DSP), etc. The at least one microcontroller 210 may require very limited computing power, for example an 8-bit microcontroller may be sufficient. The at least one microcontroller 210 may be communicatively coupled to receive signals directly from the at least one photosensitive transducer 214. In some instances, the at least one microcontroller 210 can include internal non-transitory storage media 216.

In some instances, a single microcontroller 210 controls a plurality of wiredly or wirelessly networked luminaires 202 within the illumination system 200. In such instances, the luminaires 202 in the network may be addressed and/or controlled individually, addressed and/or controlled as a plurality of sub-networks, or addressed and/or controlled as a single network. In such an arrangement, the single microcontroller 210 may transmit various signals exercising control over operation of the luminaires 202 comprising the network.

The control subsystem 102 may optionally include the non-transitory storage media 216. In at least some instances, at least a portion of the non-transitory storage media 216 may wholly or partially comprise removable storage media such as secure digital (SD) or compact flash (CF) cards, universal serial bus (USB) memory sticks, or similar components. The non-removable portion of the non-transitory storage media 216 may take any of a variety of forms, for example electrically erasable programmable read only memory (EEPROM), flash memory, solid-state memory, memristor memory, atomic memory, or combinations thereof. The non-transitory storage media 216 may have sufficient capacity to store or otherwise retain one or more sets of machine executable instructions, daily dawn and dusk times, and open storage for acquired data indicative of one or more solar events including data either internally generated by the control subsystem 102 or acquired from one or more external sources such as a network or handheld computing device. In some instances, the control subsystem 102 may automatically overwrite all or a portion of the data stored within the non-transitory storage media 216, for example every number N of daily cycles.

In at least some instances, the at least one non-transitory storage media 216 can store or otherwise retain a number of look-up tables or other data structures containing astronomical or solar event data. Such astronomical or solar event data may include sunrise and sunset times, dusk and dawn times, solar noon and solar midnight times, and the like. In at least some instances, the at least one non-transitory storage media 216 can store or contain geolocation information specific to the position or location or the intended position or location of the luminaire 206 on the surface of the Earth. Such geolocation data can include at least the latitude or other similar positioning information or coordinates sufficient to identify the location or intended location of the luminaire 202 with respect to a pole or the equator or any similar fixed geographic reference point on the surface of the Earth. In some implementations the geolocation data may include the longitude in addition to the latitude. Longitude data may be useful, for example in identifying a particular time zone (e.g., a time zone location referenced to a reference time or time zone such as coordinated universal time, UTC) in which the luminaire 202 is operating or programmed to operate. In some instances, dates and times corresponding to the conversion from daylight savings time to standard time (and vice-versa) may be stored within the non-transitory storage media 216 to permit the scheduled operation of the luminaire 202 to reflect such legislative time changes. Such geolocation, reference time, time zone, and daylight savings time data may be communicated to and stored in the non-transitory storage media 216, for example, using a portable handheld electronic device having global positioning capabilities and a communications link (wired or wireless, including RF, microwave or optical such as infrared) to the luminaire 202. Alternatively, geolocation, reference time, time zone, or daylight savings time information may be stored in a read-only portion of the at least one non-transitory storage media 216, for example when the luminaire 202 is manufactured, installed, commissioned, programmed or serviced. Alternatively, the luminaire 202 may include the internal GPS receiver 212 operative to provide global positioning capabilities.

The control subsystem 102 may include one or more integrated or discrete real time clock circuits 218. For example, a real time clock implemented on integrated circuit such as the PCF2129A as manufactured by NXP Semiconductors (Eindhoven, The Netherlands) may be used in some instances. In at least some instances, the real time clock circuit 218 may be persistently powered, for example using a standby power source 222 (e.g., one or more batteries, capacitors, ultracapacitors or similar energy storage devices). Other commercially available semiconductor chips providing real time clock functionality may be equally employed. The control subsystem 102 may implement a real time clock based on timing signals produced by the microcontroller 210, processor clock, or another oscillator. The control subsystem 102 may include a timer circuit 219 (e.g., a digital timing circuit or an analog timer circuit). In at least some instances, the timer circuit 219 may be persistently powered, for example using the standby power source 222. The timer circuit 219 may produce control signals at defined periods following an occurrence of defined times as indicated by the real-time clock circuit 218 of the control subsystem 102.

The at least one microcontroller 210 may be used to control one or more aspects of the operation of the lighting subsystem 104. In some instances, the microcontroller 210 may determine the time at which one or more ambient lighting conditions corresponding to an astronomical event such as a dawn or dusk event occur. Instructions for the operation of the lighting subsystem 104 may be rendered as one or more machine executable instruction sets and stored at least partially within a non-volatile portion of the non-transitory storage media 216.

In some instances, the luminous output of the lighting subsystem 104 may be controlled or otherwise adjusted by the at least one microcontroller 210 based at least in part on a sensed ambient light level indicative of the detected time of occurrence of one or more solar events such as a dawn event or a dusk event. The ambient light level may be sensed by the photosensitive transducer 214 or any other system or device communicably coupled to the at least one microcontroller 210 that is capable of providing at least one signal including data indicative of a sensed ambient light level. The at least one signal can be transmitted from the photosensitive transducer 214 directly or indirectly to the at least one microcontroller 210. In at least some instances, the at least one controller 210 may compare the data indicative of the ambient light level in the signal from the photosensitive transducer 214 with data indicative of one or more defined ambient light thresholds to determine whether to illuminate the light sources 120, determine the luminous output of the light sources 120, or both. The data indicative of the one or more defined ambient light thresholds may be stored or otherwise retained in the at least one microcontroller 210, the non-transitory storage 216, or combinations thereof.

The photosensitive transducer 214 that alters or controls one or more aspects (e.g., ON/OFF control, luminosity, etc.) of the luminaire 202 may be supported from the housing 110 (see FIG. 1). Such may allow the photosensitive transducer 214 to be positioned and oriented within the throw beams or spillover light from the light sources 120. As discussed further below, by sampling light from the area where the light sources 120 illuminate when the light sources are turned ON during a brief period when the light sources are turned OFF, the photosensitive transducer 214 is able to measure ambient light level where the luminaire is to be used (e.g., a sidewalk, etc.) without interference from the light sources. This is in contrast to light control systems that utilize a sensor that is optically isolated from the light output of a lamp or luminaire being controlled. In these light control systems, if the sensors were not optically isolated from the light sources, the ambient light sensor would detect light from the light source and cause the sensor to detect "daytime," turning the light source OFF, even at low ambient light levels (e.g., nighttime).

The occurrence of solar events is cyclical and predictable using one or more algorithms (e.g., a "dawn equation") or tabularized data (e.g., dawn and dusk or similar astronomical tables). Generally, when provided local geolocation and date information, the expected dawn time and the expected dusk time may be either calculated or retrieved from a data store. In at least some instances data indicative of luminaire geolocation, current time, and current date may be accessed by the at least one microcontroller 210 using one or more internal sources (e.g., non-transitory storage 216, real time clock 218, timer circuit 219, etc.), one or more external sources (e.g., a network connection or connection to a remote electronic device, etc.), or any combination thereof. By comparing current time data provided by the real time clock 218 or timer circuit 219, the at least one microcontroller 210 can control or otherwise adjust the luminous output of the light sources 120 based at least in part on the expected time of occurrence of one or more solar events.

Thus, in other instances the at least one microcontroller 210 may employ a lookup table or other data structure containing data indicative of the scheduled, predicted or expected times of occurrence of one or more solar events. In yet other instances, the at least one microcontroller 210 may calculate the expected time of occurrence of one or more solar events using one or more equations, algorithms, relationships or correlations based at least in part on the latitude at which the luminaire 202 operates or is programmed to operate, the current date, the day in the solar cycle (e.g., day 106 of a 365¼ day cycle), or the Julian date.

The control subsystem 102 may include a power converter 220 that rectifies, steps down a voltage or otherwise conditions electrical power supplied to the at least one microcontroller 210, the non-transitory storage media 216 and/or other components of the control subsystem 102. In one instance, the power converter 220 may include an AC/DC converter used to step a voltage down to a first level suitable for the control electronics of the control subsystem 102. An example of such an AC/DC converter is a "capacitor dropping" type AC/DC converter including a moderately sized capacitor (e.g., 1 microfarad capacitor) and a rectifier or bridge rectifier including a capacitor and a half- or full-bridge rectifier.

In some instances, the current time and current date may be the local time and the local date at the geographic location where the luminaire 202 is installed or is intended for installation. Such local time and local date information may be stored within the non-transitory storage media 216 along with any local time changes (e.g., Daylight Savings time changeover dates and times), leap years, or other events affecting the local time or local date. Such current time/current date or local time/local date information may be periodically or continuously provided to or updated in the luminaire using one or more external electronic devices. For example, the current or local time or date may be periodically updated using an electronic device connected via a wired or wireless network, or a portable electronic device such as a cellular telephone, portable data assistant, tablet computer, or the like.

One or more optional wired or wireless communications interfaces 224 may be disposed within the control subsystem 102. Such communications interfaces 224 may include, but are not limited to one or more optical (e.g., infrared), wired (e.g., IEEE 802.3, Ethernet, etc.) or wireless (e.g., IEEE 802.11-WiFi®; cellular-GSM, GPRS, CDMA, EV-DO, EDGE, 3G, 4G; Bluetooth®; ZigBee®; Near Field Communications; etc.) communication interfaces. The one or more communication interfaces 224 may be communicably coupled to the at least one microcontroller 210 or the at least one non-transitory storage media 216 and used to bidirectionally exchange data between the control subsystem 102 and one or more external electronic devices, systems, or networks. In some instances, the one or more communication interfaces 224 may provide the control subsystem 102 in a first luminaire 202 with the ability to unidirectionally or bidirectionally communicate with the control subsystem 102 in a number of other luminaires 202 forming the illumination system 200.

The one or more wired or wireless communications interfaces 224 facilitate the transfer of data indicative of a current time, a universal time (e.g., Coordinated Universal Time, UTC), a current date, a current day of the solar cycle (e.g., day 213 of a 365¼ solar cycle), a Julian date, or combinations thereof. The one or more wired or wireless communications interfaces 224 may facilitate the transfer of data indicative of one or more sets of machine executable instructions used by the microcontroller 210. The one or more wired or wireless communications interfaces 224 may facilitate the transfer of data indicative of one or more sets of operational code such as firmware useful in supporting the operation of the control subsystem 102.

The one or more light sources 120 of the lighting subsystem 104 may be powered using a power supply 230 and a number of driver circuits 232a-232n (two of which are shown in FIG. 2). Each of the one or more light sources 120 can include a single light source or one or more strings of electrically coupled light sources 120. In at least some instances, each of the light sources 120 may advantageously include one or more solid-state light sources such as LEDs, OLEDs, PLEDs, and the like. All or a portion of the number of light sources 120 may be selectively replaceable, removable, or interchangeable from the lighting subsystem 104. The lighting subsystem 104 may be selectively removable or interchangeable from the luminaire 202. Alternatively, the light sources 120 and all or a portion of the lighting subsystem 104 may be an integral part of the luminaire 202. Various examples of suitable light sources 120 are described above.

The power supply 230 may include one or more rectifiers, DC/DC converters, isolation transformers, filters, smoothing capacitors, etc. to rectify, step a voltage and otherwise transform or condition electrical power from an external source into a form suitable to power the components of the control subsystem 102 or lighting subsystem 104. In some instances, the power supply 230 can supply rectified DC voltage to the power converter 220 which, in turn, supplies regulated DC voltage to all or a portion of the control subsystem 102. In some instances, power flow from the power supply 230 may flow through one or more switches or similar circuit interrupters capable of disrupting current or power flow to all or a portion of the light sources 120.

The lighting subsystem 104 may employ any number of power controllers, switches, or other systems or devices configured to turn the light sources 120 ON and OFF and/or to adjust the luminous output or luminosity of the light sources 120. In some situations, the power controllers may employ various switches, for example contact switches, relays, solid-state switches, transistors, TRIACs or the like to control the flow of current or power to the number of light sources 120. In other situations, the number of power controllers may include one or more switched devices or systems, such as a switched mode power supply or power converter, the output of which can be controlled or adjusted based on at least one output signal provided by the microcontroller 210. In some instances, the number of light sources 120 can include one or more solid-state light sources and the microcontroller 210 can provide one or more pulse width modulated (PWM) output signals to the power supply 230, all or a portion of the number of driver circuits 232, or both. In at least some instances, the luminous output of the solid-state light sources 120 may be adjusted by controlling the duty cycle of the solid-state light sources 120. For example, the overall duty cycle (and consequent luminous output) of the solid-state light sources 120 may be adjusted by the control subsystem 102 by increasing or decreasing at least one of a PWM signal pulse width or frequency of the output signal provided by the microcontroller 210 to the power supply 230 or the driver circuits 232.

The power supply 230 may also supply rectified DC voltage directly to one or more driver circuits 232. In at least some instances, the driver circuits 232 can convert the input voltage to a constant current having parameters matched to the type of LEDs used to provide the light sources 120. A DC/DC converter (e.g., a DC/DC buck converter) may be used to power all or a portion of the driver circuits 232 powering the light sources 120. In addition, in some instances, the control subsystem 102 can provide a control input to at least a portion of the driver circuits 232. Such driver circuit control inputs can enable a power ON or a power OFF to the light sources 120, provide for the gradual or rapid dimming or brightening an output from the light sources 120, or various combinations thereof. For example, the control input provided by the at least one microcontroller 210 to the driver circuits 232 may be a pulse width modulation (PWM) signal sufficient to cause the driver circuits 232 to supply the constant current to the light sources 120 for a first period of time and to not supply the constant current to the light sources 120 for a second period of time.

In at least one embodiment, an AC/DC switched-mode power converter having digital input capabilities may be used to provide all or a portion of the power to the light sources 120. In such instances, the control signal provided by the microcontroller 210 may be used to selectively control the operation of the AC/DC switched mode converter. For example, an IRS2548D SMPS/LED Driver PFC+ Half-Bridge Control IC as manufactured by International Rectifier Corp. (Los Angeles, Calif.) may be used to control the flow of power to the light sources 120 using the output signal from the microcontroller 210. In such instances, the presence of a low output signal (e.g., a digital "0" signal) from the microcontroller 210 may permit the flow of current to the light sources 120 while the presence of a high output signal (e.g., a digital "1" signal) from the microcontroller 210 may inhibit the flow of current to the light sources 120. Using a logic level signal rather than a mechanical or solid-state relay to control the flow of power to the light sources 120 may reduce or eliminate the high inrush currents or inductive kick-back arcing that occurs in such relays.

As used herein and in the claims, adjusting an illumination level includes turning ON a light source from an OFF state in which no light or illumination is produced to an ON state in which at least some light or illumination is produced. As used herein and in the claims, adjusting an illumination level includes turning OFF a light source from an ON state in which at least some light or illumination is produced to an OFF state in which no light or illumination is produced.

As used herein and in the claims, adjusting an illumination level also includes increasing and/or decreasing a level of light or illumination produced. Such may include adjusting an output level for any given discrete light source. Such may additionally or alternatively include adjusting a total number of light sources that are in the ON state. For example, a first and second set or strings of light sources may be used to produce a first level of light or illumination, while only the first set or string of light sources may be used to produce a second level of light or illumination. Also for example, a first number of light sources in a first set or string may be used to produce the first level of light or illumination, while a smaller number or subset of light sources in the first set or string may be used to produce the second level of light or illumination.

The microcontroller 210 can receive a number of output signals 205 from the photosensitive transducer 214. Each of the number of output signals 205 can be indicative of levels of light sensed in the ambient environment around or proximate the photosensitive transducer 214. Where the photosensitive transducer 214 is mounted on the luminaire 202, the number of output signals 205 from the photosensitive transducer 214 are indicative of levels of light sensed in the ambient environment around or proximate the luminaire 202. Such output signals can include one or more analog signals or one or more digital signals. The control subsystem 102 may store all or a portion of the information conveyed by the number of output signals 205 in the one or more non-transitory storage media 216. In at least some instances, additional information, such as data related to the time or date of the number of output signals 205 may be associated with a respective one or more of the number of output signals 205 and stored in whole or in part with the data collected from the respective output signal in the at least one non-transitory storage media 216.

In some instances, all or a portion of the number of output signals 205 can be analog. One or more analog-to-digital (A/D) converters (not shown in FIG. 2) may be used to digitize the one or more analog output signals 205 prior to processing by the microcontroller 210. Alternatively, one or more A/D converters within the microcontroller 210 may be used to digitize the one or more analog output signals 205. The microcontroller 210 can store the information to correlate or create logical relationships between the sensed levels and a time (e.g., real time) as indicated by the real time clock circuit 218. The microcontroller 210 can use the information to determine times as indicated by the real time clock circuit 218 (i.e., in the temporal reference frame of the real time clock circuit 218) with the solar cycle for any daily cycle, and to control one or more operational parameters of the solid-state light sources 120 accordingly.

When mounted in an exterior location, the light or illumination levels sensed by the photosensitive transducer 214 may be representative or indicative of a solar time or solar cycle. For example, the microcontroller 210 may determine a time corresponding to a sensed ambient lighting condition that is associated with a solar dawn event to be a time at which the output signal provided by the photosensitive transducer 214 is at a level indicative of a dawn event. Such levels may not be consistent throughout year due to the position of the sun relative to the luminaire 202 or photosensitive transducer 214, the location of terrestrial obstructions to sunlight reaching the photosensitive transducer 214 (e.g., a mountain to the south of a luminaire in the northern hemisphere may block direct sunlight to the luminaire during the winter season), or regular atmospheric events (e.g., monsoon season may reduce the overall ambient light level). In at least some instances, the control subsystem 102 can be programmed to account for seasonal, atmospheric, or terrestrial effects on ambient lighting conditions as sensed by the photosensitive transducer 214. In at least some instances, the control subsystem 102 can be programmed to account for sporadic effects (e.g., weather, temporary lighting, blockage of the transducer 214) on ambient lighting conditions as sensed by the photosensitive transducer 214 by averaging measurements over a period time (e.g., averaging dawn event measurements over 5 days).

In at least some instances, the control subsystem 102 can monitor the ambient lighting conditions for a sufficient period of time to establish the local yearly diurnal cycle with a high degree of accuracy. Such measured diurnal cycles advantageously take into consideration the effect that local environmental factors such as seasonal variability, terrestrial obstructions and the like may have on solar events such as dawn and dusk. Having determined the local diurnal cycle either by calculation or measurement via the photosensitive transducer 214, in certain circumstances or embodiments the microcontroller 210 may track the passage of time using the real time clock circuit 218 rather than by performing comparisons to the number of output signals 205 to establish appropriate ON and OFF times for the at least one solid-state light source 120.

The photosensitive transducer 214 may have a "human eye response" sensitivity curve, so that a threshold to turn the light sources 120 ON or OFF may correspond to the apparent illumination of the area being sensed. For example, the photosensitive transducer 214 may be an amorphous silicon photo sensor, such as the AM-30-11 sensor available from Sanyo Semiconductor, a high-speed gallium arsenide phosphide (GaAsP) photodiode, available from Hamamatsu Photonics Corporation (e.g., model G1115), some other semiconductor material with an inherent human eye response sensitivity, or the photosensitive transducer may be a standard silicon or other photo detector with an additional or built-in optical filter that shapes the transducer's sensitivity to approximate that photopic response of a human eye. The photosensitive transducer 214 should generally have a fast response, so that the ambient light level may be accurately acquired during the short period that the solid-state light sources 120 are switched into the OFF state. For example the Hamamatsu G1115 GaAsP photodiode has a rise time of about one microsecond. In some embodiments the photosensitive transducer 214 may be a digital light sensor that outputs the light level in serial or parallel format.

In some instances, the photosensitive transducer 214 may not be available to control one or more aspects of the luminaire 202. In such instances, operation of the luminaire 202 at appropriate times (e.g., operation of the luminaire in a cycle approximating the local solar cycle) is still desirable. In such instances, the microcontroller 210 may be used to control the operation of the luminaire 202 based on local date, time, or latitude data stored in the non-transitory storage media 216. Such data may be stored in the non-transitory storage 216 at the time of installation or commissioning of the luminaire 202, or may be obtained by the microcontroller 210 during previous use of the luminaire 202 (e.g., when the photosensitive transducer 214 was available). The microcontroller 210 can use the stored date, time, or latitude data along with a time-keeping circuit such as a timer circuit 219 or real time clock circuit 218 to either calculate (e.g. using a dawn equation) or look-up (e.g. using look-up tables stored in the non-transitory storage media 216) the expected solar event times for the location of the luminaire 202.

Figure 3:
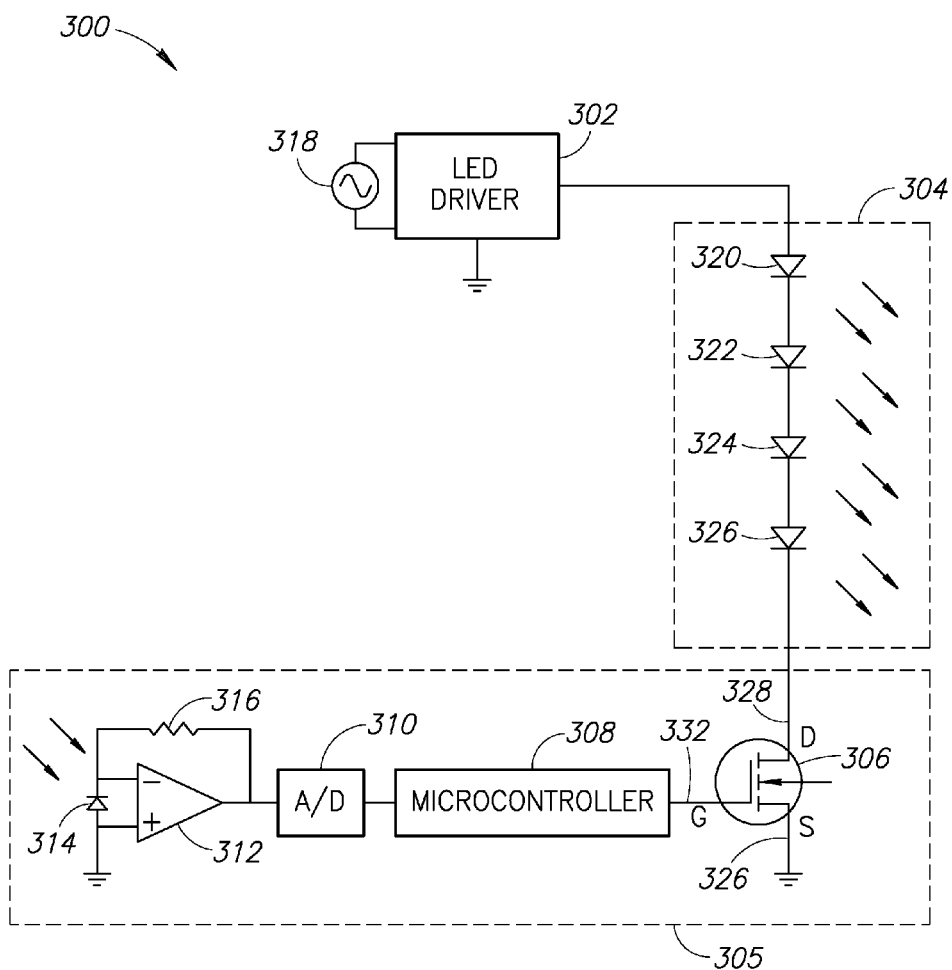
FIG. 3 is a detailed electrical schematic diagram of a luminaire, according to one non-limiting illustrated embodiment.

FIG. 3 is a detailed electrical schematic diagram of a luminaire 300 according to one illustrated embodiment. The luminaire 300 may be identical or similar to the illumination system 100 (FIG. 1), the illumination system 200 (FIG. 2), or may have a physical configuration that differs in form but is similar in function to the illumination systems 100 and 200 illustrated in FIGS. 1 and 2, respectively. The luminaire 300 includes a light emitting diode (LED) driver 302 and a light source 304. The luminaire 300 also includes a control circuit 305 that includes a switch 306, a microcontroller 308, an analog-to-digital (A/D) converter 310, a comparator 312, a photodiode 314 and a resistor 316. A power source 318 is electrically coupled to the LED driver 302.

In the embodiment illustrated in FIG. 3, the light source 304 includes a string of LEDs electrically coupled in series. More particularly, the light source 304 includes a first LED 320, a second LED 322, a third LED 324, and a fourth LED 326. The anode of the first LED 320 is electrically coupled to the LED driver 302. The cathode of the fourth LED 326 is electrically coupled to a first node 328 of the switch 306.

A second node 330 of the switch 306 is electrically coupled to a ground reference potential. A third node 332 of the switch 306 is electrically coupled to an output node of the microcontroller 308. An output node of the A/D converter 310 is electrically coupled to in input node of the microcontroller 308.

In the embodiment illustrated in FIG. 3, the switch 306 is an n-channel depletion mode Metal Oxide Semiconductor Field Effect Transistor (MOSFET). The first node 328 of the switch 306 is the drain node of the MOSFET, the second node 330 of the switch 306 is the source node of the MOSFET, the third node 332 of the switch 306 is the gate node of the MOSFET. Other types of switches may equally be used.

An output node of the comparator 312 is electrically coupled to an input node of the A/D converter 310. The anode of the photodiode 314 is electrically coupled to the ground reference potential, as is the non-inverting input of the comparator 312. The cathode of the photodiode 314 is electrically coupled to the inverting input node of the comparator 312. The resistor 316 is electrically coupled between the inverting input node of the comparator 312 and the output node of the comparator 312. In one embodiment, the comparator 312 is an operational amplifier.

When the photodiode 314 is illuminated with ambient light, the photodiode outputs a current ($I_p$) and causes a potential difference to be created between the non-inverting input node and the inverting input node of the comparator 312. A negative feedback loop created by the resistor 316 (having a resistance value of $R_f$) causes the voltage level ($V_{out}$) present at the output node of the comparator 312 to stabilize at a voltage level that brings the voltage at the inverting input node to be equivalent to the voltage at the non-inverting input node (i.e., zero volts in this example). Thus, the voltage level ($V_{out}$) present at the output node of the comparator 312 is proportional to the magnitude of the current ($I_n$) produced by the photodiode 314. Specifically, the output voltage is given as $V_{out} = -I_p \times R_f$. Accordingly, if the ambient light level is relatively low, the voltage level at the output node of the comparator 312 is relatively low; if ambient light level is relatively high, the voltage level at output node of the comparator 312 is relatively high.

The A/D converter 310 creates a digital signal having a value that is proportional to the magnitude of the voltage level at the output node of the comparator 312. Accordingly, if the magnitude of the voltage level at the output node of the comparator 312 is relatively low, the value of the digital signal output by the A/D converter 310 is relatively low. Similarly, if the magnitude of the voltage level at the output node of the comparator 312 is relatively high, the value of the digital signal output by the A/D converter 310 is relatively high. For example, when the photodiode 314 is not illuminated with ambient light, little or no voltage may be present at the output node of the comparator 312 and the A/D converter 310 may output a digital signal corresponding to a value of "0." When the photodiode 314 is illuminated with an ambient light level of 10 Lux, the voltage level present at the output node the comparator 312 may cause the A/D converter 310 to output a digital signal corresponding to a value of "10." When the photodiode 314 is illuminated with an ambient light level of 20 Lux, the voltage level present at the output node the comparator 312 may cause the A/D converter 310 to output a digital signal corresponding to a value of "20." The foregoing values have been selected for illustrative simplicity; the A/D converter 310 may output signals having different values depending on the ambient light level that illuminates the photodiode 314, so long as the output of the A/D converter is indicative of the ambient light level measured at the photodiode 314.

In the illustrated embodiment, the gate node 332 of the switch 306 is coupled to a control line of the microcontroller 308 so that the microcontroller turn the light source 104 ON and OFF by controlling the current that flows through the switch 306. In some embodiments, the microcontroller 308 may also control the operation of the LED driver 302. Generally, the light source 304 may be turned ON or OFF by the switch 306, by another switching device, by asserting a control line to the LED driver 302, or by other methods.

Figure 4:
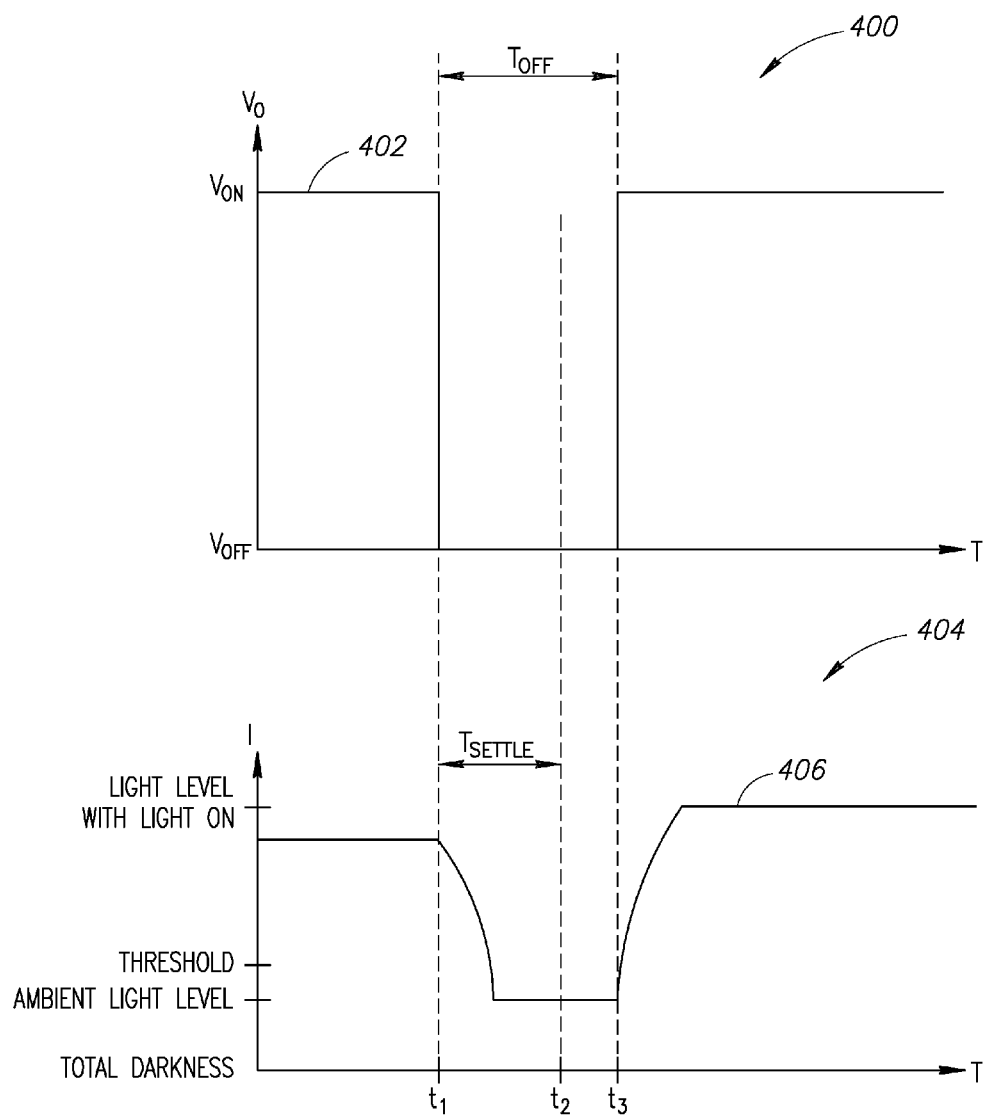
FIG. 4 is a graph showing a hypothetical plot of the output of a control subsystem and a timing diagram of an ambient light level, according to one non-limiting illustrated embodiment.

FIG. 4 is a graph showing a hypothetical plot 400 of a control signal 402 for the light source 120 and a timing diagram 404 of an ambient light level 406 during an ambient light level measurement according to one illustrated embodiment. The control signal 402 may be controlled by the microcontroller 210 of FIG. 2 (or the microcontroller 308 of FIG. 3). As shown in the plot 400, initially the control signal 402 is high ($V_{ON}$) and the light source 120 is turned ON. A time $t_1$, the control signal 402 is transitioned low ($V_{OFF}$) to turn the light source 120 OFF for a time period $T_{OFF}$. After a brief settling time $T_{SETTLE}$ (e.g., less than or equal to 150 microseconds, less than or equal to one millisecond, or the like), the microcontroller 210 obtains an ambient light level measurement taken at time $t_2$ via the photosensitive transducer 214 without the light from the light source 120. Although the light level measurement is taken while the light source 120 is turned OFF, it is not necessary for the microcontroller 210 to receive the light level measurement while the light source is turned OFF.

As discussed above, the photosensitive transducer 214 may be directed in the same direction as the light source 120 so that the photosensitive transducer may measure the ambient light level of an area that is to be illuminated by the light source 120 when the light source is turned ON. The microcontroller 210 turns the light source 120 back ON after obtaining the ambient light level measurement at time $t_3$ (e.g., 100 microseconds after time $t_2$). In some embodiments, the total time the light source 120 is OFF ($T_{OFF}$) during the ambient light level measurement process is short enough to be unnoticeable by a human observer (e.g., 250 microseconds, one millisecond, two milliseconds, etc.). Thus, advantageously, even when the light source 120 is in the ON state (e.g., at night), ambient light level measurements that do not include light emitted from the light source 120 may be obtained without observable disruption in the operation of the luminaire 202.

Figure 5:
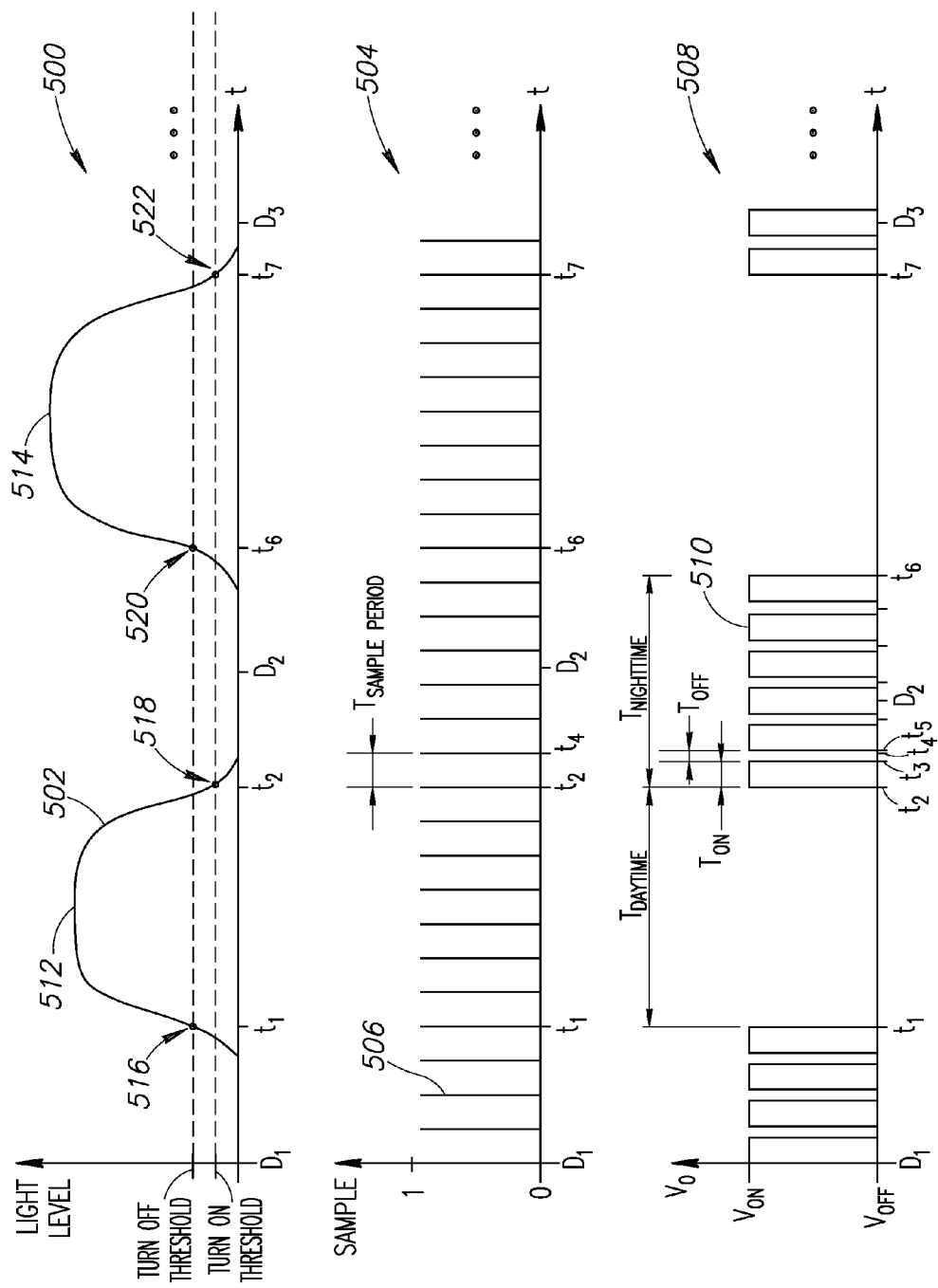
FIG. 5 is a graph showing a plot of an ambient light level measurement over a period of two days, a plot indicating sampling events for a photosensitive transducer, and a plot of a control signal for a light source, according to one illustrated embodiment.

FIG. 5 is a simplified illustration showing a plot 500 of an ambient light level 502 over a period of two days (days $D_1$ and $D_2$), a plot 504 indicating a plurality of sampling events 506 for the photosensitive transducer 214 (or the photosensitive transducer 126) during the two days, and a plot 508 of a control signal 510 for the light source 120 during the two days, according to one illustrated embodiment. The control signal 510 may be controlled by the microcontroller 210 of FIG. 2 (or the microcontroller 308 of FIG. 3). The illustration of FIG. 5 is provided for explanatory purposes and may not be to scale.

The ambient light level 502 may correspond to an analog or digital output of the photosensitive transducer 214 of the luminaire 200 of FIG. 2. Similarly, the ambient light level 502 may correspond to the analog output of the comparator 312 or the digital output of the A/D converter 310 associated with the luminaire 300 of FIG. 3. As shown, the ambient light level 502 increases around time $t_1$ on day $D_1$, reaches a peak 512, and then decreases through time $t_2$. For example, time $t_1$ may be 6:00 AM and time $t_2$ may be 8:00 PM. The specific times for $t_1$ and $t_2$ will vary depending on the latitude and longitude, the time of year, the weather, etc. The cycle then repeats for day $D_2$. The ambient light level 502 rises around time $t_6$, reaches a peak 514, and falls through time $t_7$. In this example the peak 514 on day $D_2$ is larger than the peak 512 on day $D_1$, indicating that day $D_1$ may have been more cloudy than day $D_2$.

The plot 504 illustrates the plurality of sampling events 506 for the photosensitive transducer 214 over days $D_1$ and $D_2$. The sampling events 506 are indicative of the times when measurements are actually taken by the photosensitive transducer 214. The measurements may correspond to an analog or digital output of the photosensitive transducer 214 of the luminaire 200 of FIG. 2, or may correspond to the analog output of the comparator 312 or the digital output of the A/D converter 310 associated with the luminaire 300 of FIG. 3. The sampling events 506 may be triggered by the microcontroller 210 of FIG. 2 (or the microcontroller 308 of FIG. 3), or by any other suitable method. As shown, the sampling events 506 are spaced apart in time by a sampling period ($T_{SAMPLE\ PERIOD}$). The sampling period may be any suitable value, such as one hour, 10 minutes, one minute, one second, 0.5 seconds, etc. The sampling period may also be expressed as a sampling frequency ($f_{SAMPLE}$), which is the reciprocal of the sampling period. For example, the sampling frequency may be 0.05 samples per minute, 1 sample per minute, 100 samples per minute, etc. In some embodiments, the sampling period may be variable or random. In some embodiments, the sampling period may be fixed at a first value during certain circumstances (e.g., daytime) and fixed at a second value during certain other circumstances (e.g., nighttime). Although only a few sampling events 506 are shown in FIG. 5, it should be appreciated that in some embodiments several hundred or several thousand sampling events may occur each day. For example, if the sampling period is one second, there would be 86,400 sampling events 506 each day.

A turn OFF threshold is shown in the plot 500 of the ambient light level 502. The turn OFF threshold is a light level threshold at which the light source 120 should generally be switched from ON to OFF (e.g., indicating a transition from night to day). The turn OFF threshold may be a fixed or variable value, e.g., 30 Lux.

A turn ON threshold is also shown in the plot 500 of the ambient light level 502. The turn ON threshold is a light level threshold at which the light source 120 should generally be switched from OFF to ON (e.g., indicating a transition from day to night). The turn ON threshold may be a fixed or variable value, e.g., 10 Lux. The turn ON threshold may be the same as or different from the turn OFF threshold. In this illustrated example, the turn ON threshold is lower than the turn OFF threshold to provide hysteresis that reduces the likelihood that electrical or optical noise will cause the light source 120 to oscillate between the ON state and the OFF state when the ambient light level is near a single switching threshold.

Prior to time $t_1$, the light source 120 is turned ON and the ambient light level 502 during each sampling event 506 is below the turn OFF threshold. The sampling event 506 at time $t_1$ determines the ambient light level 502 has increased to the turn OFF threshold, as indicated by the arrow 516. Once this determination has been made, the control subsystem 102 turns OFF the light source 120 at time $t_1$, indicating the beginning of a daytime period ($T_{DAYTIME}$), also referred to herein as "daytime mode." As discussed below, the control subsystem 102 may check additional conditions before turning OFF the light source 120.

The control subsystem 102 continues to sample the ambient light level 502 every sampling period throughout the day $D_1$ while the light source 120 is turned OFF. At the sampling event 506 occurring at time $t_2$, the control subsystem 102 determines that the ambient light level 506 is below the turn ON threshold, as indicated by the arrow 518. Once this determination has been made, the control subsystem 102 turns ON the light source 120 at time $t_2$, indicating the end of the daytime period and the beginning of a nighttime period ($T_{NIGHTTIME}$), also referred to herein as "nighttime mode." As discussed below, the control subsystem 102 may check additional conditions before turning ON the light source 120.

After waiting a determined ON time interval ($T_{ON}$), the control subsystem 102 turns OFF the lights source 120 at time $t_3$ for a determined OFF time interval ($T_{OFF}$) to obtain a measurement of the ambient light level 502 during a sampling event 506 at time $t_4$. Non-limiting examples of the ON time interval include one minute, one second, 0.5 seconds, etc. Non-limiting examples of the OFF time interval include 0.5 milliseconds, one millisecond, two milliseconds, etc. The process for obtaining an ambient light level measurement is described above with reference to FIG. 4. In general, the light source 120 is switched OFF (e.g., at time $t_3$) and a measurement from the photosensitive transducer 214 is taken after a brief settling time (e.g., at time $t_4$). The ambient light level measurement is taken while the light source 120 is switched OFF so that light from the light source does not affect the measurement. After the measurement is taken, the light source 120 is switched back ON (e.g., at time $t_5$) for another ON time interval. In some embodiments, the light source 120 may be switched back ON only if certain criteria are met, as discussed below. As discussed above, the duration of time the light source 120 is turned OFF during the measurement may be short so as to be imperceptible to a human user.

The control subsystem 102 subsequently continues obtaining ambient light level measurements each sampling event 506 throughout the night between day $D_1$ and $D_2$ using this process until the sampling event at time $t_6$ in the morning of $D_2$, at which time the control subsystem determines the ambient light level 502 has again risen above the turn OFF threshold (e.g., indicating a transition from night to day), as indicated by the arrow 520. The control subsystem then turns the light source 120 OFF and continues to obtain ambient light level measurements every sampling period throughout the day $D_2$ until the sampling event 506 occurring at time $t_7$, where the control subsystem determines that the ambient light level is again below the turn ON threshold, as indicated by the arrow 522, and the control subsystem turns ON the light source 120. This cycle repeats continuously.

Figure 6:
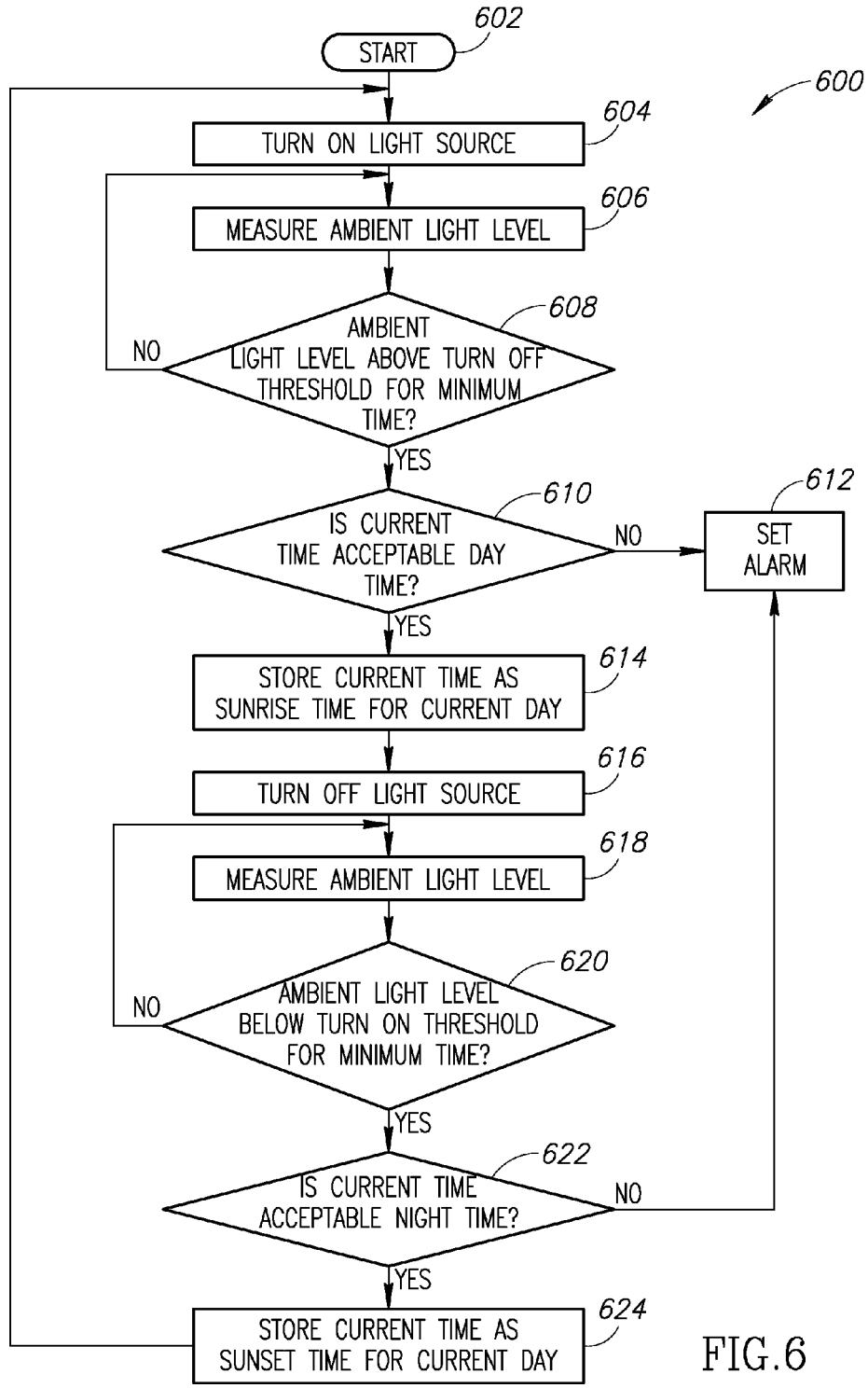
FIG. 6 is a flowchart of a control process to operate a luminaire using a photosensitive transducer, according to one non-limiting illustrated embodiment.

FIG. 6 is a flowchart of a control process 600 according to one illustrated embodiment. The process 600 may be rendered as one or more sets of machine executable instructions at least partially stored in the at least one non-transitory storage media 216 of the luminaire 202 and executed by the microcontroller 210. The process 600 may also be rendered as one or more sets of machine executable instructions at least partially stored in a memory of the microcontroller 308 of the luminaire 300 and executed by the microcontroller 308. It should be appreciated that the process 600 may be implemented in one or more of the illustrated embodiments disclosed herein. The method 600 commences at 602.

At 604, the control subsystem 102 turns ON the light source 120. At 606, the control subsystem 102 obtains an ambient light level measurement. The process for obtaining an ambient light level measurement is described above with reference to FIG. 4. In general, the light source 120 is switched OFF and a measurement from the photosensitive transducer 214 is taken after a brief settling time. The ambient light level measurement is taken while the light source 120 is switched OFF so that light from the light source does not affect the measurement. After the measurement is taken, the light source 120 is switched back ON. In some embodiments, the light source 120 may be switched back ON only if certain criteria are met, as discussed below. As discussed above, the duration of time the light source 120 is turned OFF during the measurement may be short so as to be imperceptible to a human user.

The control subsystem 102 may wait for a determined measurement time interval between ambient light level measurements (e.g., a sampling period). The measurement time interval may be fixed or variable, and may be stored in the at least one non-transitory storage media 216 of the control subsystem 102. For example, the measurement time interval may be set to one second, five seconds, one minute, or any other suitable value.

At 608, the control subsystem 102 may determine whether the ambient light level has been above a turn OFF threshold for a minimum time (e.g., indicating a transition from night to day). The turn OFF threshold may be a fixed or variable value, e.g., 30 Lux. The minimum time may be a fixed or variable value, e.g., five minutes. The control subsystem 102 may utilize the minimum time requirement to ensure the light source 120 is not turned OFF when short periods of light are sensed (e.g., a flashlight or laser beam is directed onto the luminaire 202). In some embodiments, conditions in addition to or other than minimum time may be used. For example, in some embodiments, the control subsystem may determine whether the ambient light level has been above a turn OFF threshold for a minimum number of measurements (e.g., 500 measurements, etc.). In other embodiments, the control subsystem may determine whether the ambient light level has been above a turn OFF threshold for a number M out of the last number N measurements (e.g., 450 of the last 500 measurements). Other suitable conditions may be used.

The control subsystem 102 may continue measuring the ambient light level (at 606) until the ambient light level has been above the turn OFF threshold for the minimum time. At 610, in some embodiments before turning OFF the light source 120 the control subsystem 102 may check to determine whether the current time is within an acceptable range for daytime (e.g., 5:00 AM to 11:00 PM). The acceptable range for daytime may be fixed or variable, and may be programmed manually or determined empirically based on previous measurements. If the control subsystem 102 determines that the current time is not within the acceptable range for daytime (e.g., the current time is 2:00 AM), at 612 the control subsystem 102 may set an alarm condition that may be stored in the at least one non-transitory storage media 216. In some embodiments the alarm condition may be communicated to other entities by wired or wireless communication methods. In some embodiments, the alarm condition may be used by one or more control processes to modify the operation of the luminaire 202.

If the control subsystem 102 determines that the current time is within the acceptable range for daytime, at 614 the control system turns OFF the light source 120. At 616, the control subsystem 102 may also store the current time as the dawn time for the current day. In some embodiments the dawn time may be stored in the at least one non-transitory storage media 216.

At 618, the control subsystem 102 obtains an ambient light level measurement when the light source 120 is switched OFF (e.g., during daytime). When the light source 120 is switched OFF, a measurement from the photosensitive transducer 214 may be taken without altering the state of the light source since no light is being emitted from the light source that would affect the measurement. The control subsystem 102 may wait for a determined measurement time interval between ambient light level measurements. The time measurement interval may be fixed or variable, and may be stored in the at least one non-transitory storage media 216 of the control subsystem 102. For example, the measurement time interval may be set to one second, five seconds, one minute, or any other suitable value.

At 620, the control subsystem 102 may determine whether the ambient light level has been below a turn ON threshold for a minimum time (e.g., indicating a transition from day to night). The turn ON threshold may be a fixed or variable value, e.g., 10 Lux. The minimum time may be a fixed or variable value, e.g., five minutes. The control subsystem 102 may utilize the minimum time requirement to ensure the light source 120 is not turned ON when short periods of darkness are sensed (e.g., an object temporarily blocks sunlight to the luminaire 202). In some embodiments, conditions in addition to or other than minimum time may be used (e.g., number of measurements).

The turn ON threshold may be the same as or different from the turn OFF threshold. For example, in some embodiments the turn ON threshold may be lower than the turn OFF threshold to provide hysteresis that reduces the likelihood that electrical or optical noise will cause the light source 120 to oscillate between the ON state and the OFF state when the ambient light level is near a single switching threshold.

The control subsystem 102 may continue measuring the ambient light level (at 618) until the ambient light level has been below the turn ON threshold for the minimum time. At 622, in some embodiments before turning ON the light source 120 the control subsystem 102 may check to determine whether the current time is within an acceptable range for nighttime (e.g., 10:00 PM to 5:00 AM). The acceptable range for night time may be fixed or variable, and may be programmed manually or determined empirically based on previous measurements. If the control subsystem 102 determines that the current time is not within the acceptable range for nighttime (e.g., the current time is 1:00 PM), at 612 the control subsystem 102 may set an alarm condition that may be stored in the at least one non-transitory storage media 216. In some embodiments the alarm condition may be communicated to other entities by wired or wireless communication methods. In some embodiments, the alarm condition may be used by one or more control processes to modify the operation of the luminaire 202.

If the control subsystem 102 determines that the current time is within the acceptable range for nighttime, at 624 the control subsystem 102 may store the current time as the dusk time for the current day. In some embodiments the dusk time may be stored in the at least one non-transitory storage media 216. The control subsystem 102 then turns ON the light source 120 at 604, and the process 600 repeats.

Figure 7:
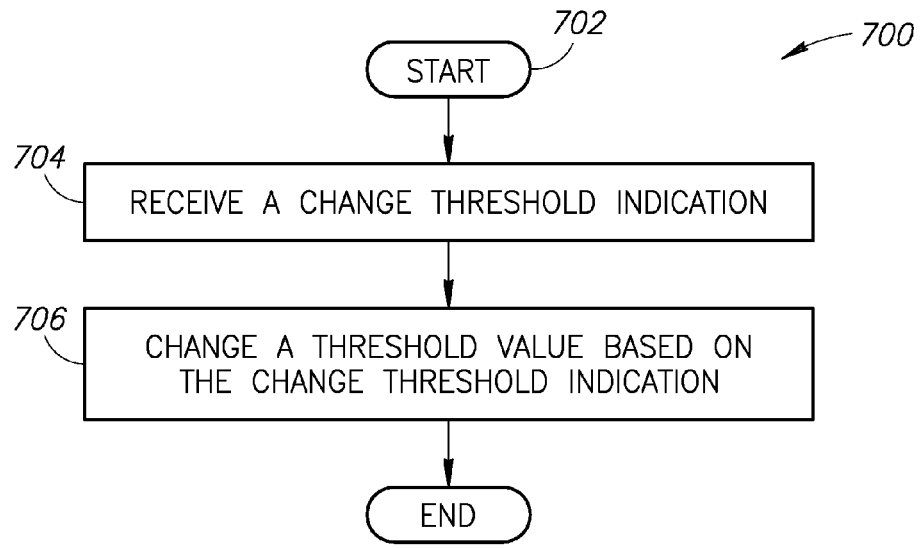
FIG. 7 is a flowchart of a control process to change a light threshold value of a luminaire, according to one non-limiting illustrated embodiment.

FIG. 7 is a flowchart of a control process 700 for changing a switching threshold (e.g., a turn ON threshold or a turn OFF threshold), according to one illustrated embodiment. The process 700 commences at 702. At 704, the control subsystem 102 receives a change threshold indication. For example, the change threshold indication may be to change the turn ON threshold from 10 Lux to 15 Lux. The change threshold indication may be received externally through a wired or wireless interface (e.g., from a mobile device, from another luminaire 202, etc.). The change threshold indication may also be received internally via instructions executable by the microcontroller 210. In response to receiving the change threshold indication, the control subsystem 102 may change a threshold value and store the changed threshold value in the at least one non-transitory storage media 216. In some embodiments, the switching thresholds may be set using a wired or wireless interface so that the conditions of a particular locality of installation may be accounted for at the time of installation. For example, a Bluetooth® wireless signal may be sent with instructions to increase or decrease the switching thresholds of the luminaire 202 relative to a factory setting. To reduce energy costs, the switching thresholds may be set to relatively low ambient light levels so that the light source 120 is only turned ON at relatively low ambient light levels. Conversely, in areas where safety is paramount (e.g., near a school), the switching thresholds may be set to relatively high ambient light levels so that the light source 120 is turned ON at relatively high ambient light levels.

In some embodiments, the switching thresholds may be initially set by a calibration step during manufacture of the luminaire 202. For example, during the manufacturing process the luminaire 202 may be placed in a controlled light level environment (e.g., 10 Lux), and a change threshold indication signal may be sent to the control subsystem 102 providing instructions to set a switching threshold to a level equal to, or related to, the controlled light level. The turn ON threshold and the turn OFF threshold may be dependent on a physical characteristic of the cover 122. For example, if the cover 122 includes a light transmissive portion that diffuses light from the light source 120 exiting the cover and integrates light entering the cover that is imparted onto the photosensitive transducer 214, the thresholds may be set lower than if no cover was present. In some embodiments, depending on the type of photosensitive transducer 214 that is used, a calibration step may not be required.

Figure 8:
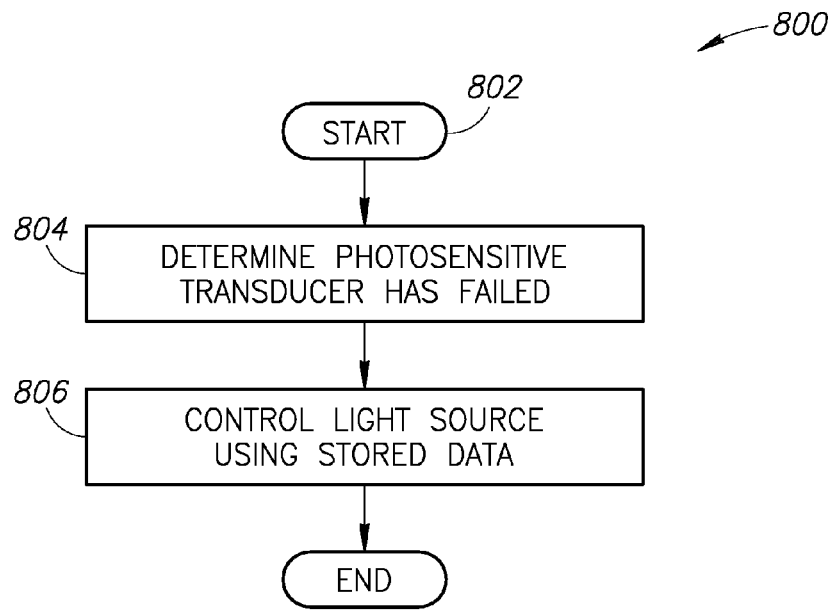
FIG. 8 is a flowchart of a control process to operate a luminaire using stored data, according to one non-limiting illustrated embodiment.

FIG. 8 is a flowchart of a control process 800 for operating a luminaire without using a photosensitive transducer, according to one illustrated embodiment. The process 800 may be rendered as one or more sets of machine executable instructions at least partially stored in the at least one non-transitory storage media 216 of the luminaire 202 and executed by the microcontroller 210. More generally, the process 800 may be implemented in one or more of the illustrated embodiments disclosed herein. The process 800 commences at 802.

At 804, the control subsystem 102 determines that the photosensitive transducer 214 has failed or is otherwise unavailable. This determination may be made using pre-programmed or acquired data including data from the clock 218, timer 218, GPS receiver 212, non-transitory storage media 216, or combinations thereof. For example, the timer 218 may be used as a "watchdog" to identify conditions when the photosensitive transducer 214 is not operating properly. As another example, the control subsystem 102 may compare switching times with stored historical switching times to detect abnormal operating conditions for the photosensitive transducer 214.

At 806, after determining the photosensitive transducer 214 is temporarily or permanently unavailable, the control subsystem 102 begins controlling the operation of the light source 120 using stored data. As discussed above, the time of occurrence of various solar events (e.g., a dawn event, a dusk event) may be stored in the non-transitory storage media 216 accessible by the control subsystem 102. In addition to being measured via the photosensitive transducer 214 when operational, the time of occurrence of various solar events may additionally or alternatively be calculated using geolocation, time, or date data either generated by or stored within the control subsystem 102 or obtained from one or more external devices via one or more wired or wireless communication interfaces either in or communicably coupled to the control subsystem 102. In some instances, the control subsystem 102 may automatically overwrite all or a portion of the data stored within the non-transitory storage media 216, for example every number N of daily cycles.

In some embodiments, the control subsystem 102 may monitor the operation of the photosensitive transducer 214 while controlling the light source 120 using the stored data, and to return to controlling the light source 120 using the photosensitive transducer after determining it is once again available for use (e.g., the photosensitive transducer has been repaired or replaced). In some instances monitoring the availability of the photosensitive transducer 214 includes obtaining ambient light level measurements using the photosensitive transducer 214 and comparing the measurements with expected values.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 61/052,924, filed May 13, 2008; U.S. Patent Publication No. US 2009/0284155, published Nov. 19, 2009; U.S. Provisional Patent Application No. 61/051,619, filed May 8, 2008; U.S. Pat. No. 8,118,456, issued Feb. 12, 2012; U.S. Provisional Patent Application No. 61/088,651, filed Aug. 13, 2008; U.S. Patent Publication No. US 2010/0090577, published Apr. 15, 2010; U.S. Provisional Patent Application No. 61/115,438, filed Nov. 17, 2008; U.S. Provisional Patent Application No. 61/154,619, filed Feb. 23, 2009; U.S. Patent Publication No. US2010/0123403, published May 20, 2010; U.S. Provisional Patent Application No. 61/174,913, filed May 1, 2009; U.S. Patent Publication No. US2010/0277082, published Nov. 4, 2010; U.S. Provisional Patent Application No. 61/180,017, filed May 20, 2009; U.S. Patent Publication No. US2010/0295946, published Nov. 25, 2010; U.S. Provisional Patent Application No. 61/229,435, filed Jul. 29, 2009; U.S. Patent Publication No. US2011/0026264, published Feb. 3, 2011; U.S. Provisional Patent Application No. 61/295,519 filed Jan. 15, 2010; U.S. Provisional Patent Application No. 61/406,490 filed Oct. 25, 2010; U.S. Patent Publication No. US2011/0175518, published Jul. 21, 2011; U.S. Provisional Patent Application Ser. No. 61/333,983, filed May 12, 2010; U.S. Patent Publication No. US2010/0295454, published Nov. 25, 2010; U.S. Provisional Patent Application Ser. No. 61/346,263, filed May 19, 2010, U.S. Patent Publication No. US2010/0295455, published Nov. 25, 2010; U.S. Provisional Patent Application Ser. No. 61/357,421, filed Jun. 22, 2010; U.S. Patent Publication No. US2011/0310605, published Dec. 22, 2011; U.S. Patent Publication No. 2012/0262069, published Oct. 18, 2012; U.S. Non-Provisional patent application Ser. No. 13/212,074, filed Aug. 17, 2011; U.S. Provisional Patent Application Ser. No. 61/527,029, filed Aug. 24, 2011; U.S. Non-Provisional patent application Ser. No. 13/592,590 filed Aug. 23, 2012; U.S. Provisional Patent Application Ser. No. 61/534,722, filed Sep. 14, 2011; U.S. Non-Provisional patent application Ser. No. 13/619,085, filed Sep. 14, 2012; U.S. Provisional Patent Application Ser. No. 61/567,308, filed Dec. 6, 2011; U.S. Provisional Patent Application Ser. No. 61/561,616, filed Nov. 18, 2011; U.S. Provisional Patent Application Ser. No. 61/641,781, filed May 2, 2012; U.S. Non-Provisional patent application Ser. No. 13/411,321 filed Mar. 2, 2012; U.S. Provisional Patent Application Ser. No. 61/640,963, filed May 1, 2012; U.S. Provisional Patent Application No. 61/764,395 filed Feb. 13, 2013; U.S. Non-Provisional patent application Ser. No. 13/558,191 filed Jul. 25, 2012; U.S. Provisional Patent Application Ser. No. 61/692,619, filed Aug. 23, 2012; U.S. Provisional Patent Application Ser. No. 61/694,159, filed Aug. 28, 2012; U.S. Non-Provisional patent application Ser. No. 13/604,327 filed Sep. 5, 2012; U.S. Provisional Patent Application Ser. No. 61/723,675, filed Nov. 7, 2012; U.S. Non-Provisional patent application Ser. No. 13/679,687, filed Nov. 16, 2012; U.S. Provisional Patent Application Ser. No. 61/728,150, filed Nov. 19, 2012; U.S. Provisional Patent Application Ser. No. 61/764,395, filed Feb. 13, 2013; Provisional patent application Ser. No. 13/786,114 filed Mar. 5, 2013, U.S. Non-Provisional patent application Ser. No. 13/786,332 filed Mar. 5, 2013; U.S. Non-Provisional patent application Ser. No. 13/875,000 filed May 1, 2013; U.S. Provisional Patent Application No. 61/849,841 filed Jul. 24, 2013; U.S. Provisional patent application Ser. No. 13/973,696 filed Aug. 22, 2013; U.S. Provisional Patent Application No. 61/878,425 filed Sep. 16, 2013; U.S. Non-Provisional patent application Ser. No. 14/074,166 filed Nov. 7, 2013; U.S. Provisional Patent Application No. 61/905,699 filed Nov. 18, 2013; and U.S. Provisional Patent Application No. 61/933,733 filed Jan. 30, 2014 are incorporated herein by reference, in their entirety. Aspects of the embodiments can be modified, if necessary, to employ systems, circuits and concepts of the various patents, applications and publications to provide yet further embodiments.

For example, a photocontrol apparatus according to the present disclosure can provide control signals to a control device that receives additional control signals from other environmental sensors, for example, a motion sensor, a proximity sensor, and an occupancy sensor. Such a control device can be programmed to control a luminaire based on the control signals received from two or more of the environmental sensors and a current time of day. For example, the control device can cause the luminaire to produce a signal indicating a security breach and to illuminate an array of LEDs if, during a time period specified for night operations, the photocontrol indicates that a detected light level is above a desired level and a motion sensor indicates that motion has been detected.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
   providing a luminaire comprising:
   a cover having a light transmissive portion at least partially formed from a light transmissive material;
   a solid-state light source disposed within the cover, the solid-state light source having an illumination path that passes through at least a portion of the light transmissive portion, the solid-state light source operative in an OFF state in which no light is produced and an ON state in which at least some light is produced; and
   a photosensitive transducer disposed within the cover, the photosensitive transducer having a detection path that passes through at least a portion of the light transmissive portion and at least partially overlaps with the illumination path of the solid-state light source, the photosensitive transducer operative to provide photosensitive transducer signals each indicative of a light level of the detection path at a respective sampling time;
   alternatingly operating the luminaire in a daytime mode wherein the solid-state light source is in the OFF state and a nighttime mode wherein the solid-state light source produces at least some light in the illumination path, operating the luminaire in the daytime mode comprises:
   from time to time obtaining a photosensitive transducer signal from the photosensitive transducer;

analyzing a plurality of the obtained photosensitive transducer signals to determine the presence of a turn ON condition; and in response to determining the presence of the turn ON condition, controlling the solid-state light source to be in the ON state and transitioning the luminaire from the daytime mode to the nighttime mode;

wherein operating the luminaire in the nighttime mode comprises:

from time to time controlling the solid-state light source to be in the OFF state for an OFF period that is imperceptible to a human;

obtaining a photosensitive transducer signal having a sampling time that occurs during the OFF period while the solid-state light source is in the OFF state;

analyzing a plurality of the obtained photosensitive transducer signals to determine the presence of a turn OFF condition; and in response to determining the presence of the turn OFF condition, controlling the solid-state light source to be in the OFF state and transitioning the luminaire from the nighttime mode to the daytime mode.

2. The method of claim 1 wherein the light transmissive portion of the cover is translucent and diffuses at least some light passing therethrough.

3. The method of claim 1 wherein analyzing a plurality of the obtained photosensitive transducer signals to determine the presence of a turn ON condition comprises comparing the plurality of the obtained photosensitive transducer signals to a turn ON threshold value.

4. The method of claim 3 wherein analyzing a plurality of the obtained photosensitive transducer signals to determine the presence of a turn ON condition comprises determining whether the plurality of the obtained photosensitive transducer signals have been below the turn ON threshold value for a determined time period.

5. The method of claim 1 wherein analyzing a plurality of the obtained photosensitive transducer signals to determine the presence of a turn OFF condition comprises comparing the plurality of the obtained photosensitive transducer signals to a turn OFF threshold value.

6. The method of claim 5 wherein analyzing a plurality of the obtained photosensitive transducer signals to determine the presence of a turn OFF condition comprises determining whether a number N of the plurality of the obtained photosensitive transducer signals are above the turn OFF threshold value.

7. The method of claim 1 wherein analyzing a plurality of the obtained photosensitive transducer signals to determine the presence of a turn ON condition comprises comparing the plurality of the obtained photosensitive transducer signals to a turn ON threshold value, and analyzing a plurality of the obtained photosensitive transducer signals to determine the presence of a turn OFF condition comprises comparing the plurality of the obtained photosensitive transducer signals to a turn OFF threshold value.

8. The method of claim 7 wherein the turn ON threshold value is different than the turn OFF threshold value.

9. The method of claim 1 wherein obtaining a photosensitive transducer signal having a sampling time that occurs during the OFF period while the solid-state light source is in the OFF state comprises obtaining a photosensitive transducer signal having a sampling time that is a settling time delay after initiation of the controlling of the solid-state light source to be in the OFF state for the OFF period.

10. The method of claim 1 wherein the OFF period is less than or equal to two milliseconds.

11. The method of claim 1, further comprising:

in response to determining the presence of the turn ON condition, obtaining a current time and a current date;

associating the current time and the current date with a dusk event;

storing the associated current time, current date and dusk event in a non-transitory storage medium;

in response to determining the presence of the turn OFF condition, obtaining a current time and a current date;

associating the current time and the current date with a dawn event; and storing the associated current time, current date and dawn event in the non-transitory storage medium.

12. The method of claim 1, further comprising:

verifying whether at least one of the plurality of obtained photosensitive transducer signals is within an expected range of values; and controlling the operation of the solid-state light source according to a schedule if not verified.

13. A method of operating a luminaire including a photosensitive transducer and a solid-state light source, the photosensitive transducer being physically oriented to detect light within an illumination path of the light source, the method comprising:

controlling the light source to be in an ON state in which at least some light is produced;

controlling the light source to be in an OFF state in which no light is produced for an OFF period before controlling the light source to return to the ON state, the OFF period being sufficiently short in duration such that the light source being in the OFF state for the OFF period is imperceptible to a human;

obtaining at least one first value from the photosensitive transducer, the at least one first value corresponding to an ambient light level measurement of the illumination path taken while the light source is in the OFF state for the OFF period;

determining whether the at least one first value is greater than or equal to a dawn threshold value; and controlling the light source to be in one of the ON state and the OFF state depending on the determining of whether the at least one first value is greater than or equal to the dawn threshold value.

14. The method of claim 13 wherein the at least one first value from the photosensitive transducer corresponds to an ambient light level measurement of the illumination path at a time at least a settling time delay after initiating the controlling of the light source to be in the OFF state.

15. The method of claim 13 wherein the OFF period is less than or equal to two milliseconds.

16. The method of claim 13, further comprising:

responsive to determining that the at least one first value is greater than or equal to the dawn threshold value, obtaining a current time;

logically associating the current time with a transition from nighttime to daytime for a current day; and storing the logical association in a non-transitory storage medium.

17. A luminaire, comprising:

a cover having a light transmissive portion at least partially formed from a light transmissive material;

a solid-state light source disposed within the cover, the solid-state light source having an illumination path that passes through at least a portion of the light transmissive portion, the solid-state light source operative in an OFF state in which no light is produced and an ON state in which at least some light is produced;

a photosensitive transducer disposed within the cover, the photosensitive transducer having a detection path that passes through at least a portion of the light transmissive portion and at least partially overlaps with the illumination path of the solid-state light source, the photosensitive transducer operative to provide photosensitive transducer signals each indicative of a light level of the detection path at a respective sampling time; and a control subsystem communicatively coupled to the photosensitive transducer to receive the photosensitive transducer signals therefrom, and communicatively coupled to the solid-state light source to control the solid-state light source, the control subsystem including a processing unit and a non-transitory storage medium storing instructions that, when executed by the processing unit, cause the control subsystem to:

alternatingly operate the luminaire in a daytime mode wherein the solid-state light source is in the OFF state and a nighttime mode wherein the solid-state light source produces at least some light in the illumination path, wherein, when the instructions cause the control subsystem to operate in the daytime mode, the instructions cause the control subsystem to:

from time to time obtain a photosensitive transducer signal from the photosensitive transducer;

analyze a plurality of the obtained photosensitive transducer signals to determine the presence of a turn ON condition; and when the presence of the turn ON condition is determined, control the solid-state light source to be in the ON state and transition the luminaire from the daytime mode to the nighttime mode;

wherein, when the instructions cause the control subsystem to operate in the nighttime mode, the instructions cause the control subsystem to:

from time to time control the solid-state light source to be in the OFF state for an OFF period that is imperceptible to a human;

obtain a photosensitive transducer signal having a sampling time that occurs during the OFF period while the solid-state light source is in the OFF state;

analyze a plurality of the obtained photosensitive transducer signals obtained during the OFF periods to determine the presence of a turn OFF condition; and when the presence of the turn OFF condition is determined, control the solid-state light source to be in the OFF state and transition the luminaire from the nighttime mode to the daytime mode.

18. The luminaire of claim 17 wherein the instructions cause the control subsystem to compare the plurality of the obtained photosensitive transducer signals to a turn ON threshold value.

19. The luminaire of claim 17 wherein the instructions cause the control subsystem to compare the plurality of the obtained photosensitive transducer signals to a turn OFF threshold value.

20. The luminaire of claim 17 wherein the instructions cause the control subsystem to compare the plurality of the obtained photosensitive transducer signals to a turn ON threshold value, and to compare the plurality of the obtained photosensitive transducer signals to a turn OFF threshold value.

21. The luminaire of claim 20 wherein the turn ON threshold value is different than the turn OFF threshold value.

22. The luminaire of claim 17 wherein, when the instructions cause the control subsystem to operate in the nighttime mode, the instructions cause the control subsystem to:

from time to time at a rate greater than or equal to a sampling frequency:

control the solid-state light source to be in the OFF state for the OFF period that is imperceptible to a human; and obtain a photosensitive transducer signal having a sampling time that occurs during the OFF period while the solid-state light source is in the OFF state.

23. A luminaire, comprising:

at least one solid-state light source having an illumination path;

at least one photosensitive transducer responsive to at least one physical characteristic indicative of at least one light condition, the at least one photosensitive transducer being physically oriented to detect light in the illumination path of the at least one solid-state light source; and a control subsystem communicatively coupled to the photosensitive transducer to receive photosensitive transducer signals indicative of the at least one light condition in the illumination path sensed by the photosensitive transducer, and communicatively coupled to the at least one solid-state light source to control the at least one solid-state light source to be in an OFF state in which no light is produced and an ON state in which at least some light is produced, the control subsystem including a processing unit and a non-transitory storage medium storing instructions that, when executed by the processing unit, cause the control subsystem to:

control the at least one solid-state light source to be in the ON state responsive at least in part to the photosensitive transducer signals;

control the at least one solid-state light source to be in the OFF state for an OFF period that is imperceptible to a human;

obtain at least one of the photosensitive transducer signals, the at least one of the photosensitive transducer signals indicative of the at least one light condition in the illumination path sensed by the at least one photosensitive transducer during at least a portion of the OFF period while the at least one solid-state light source is in the OFF state;

compare the at least one obtained photosensitive transducer signal to a first threshold value; and control the at least one solid-state light source to be in the OFF state responsive at least in part to comparing the at least one obtained photosensitive transducer signal to the first threshold value.

24. The luminaire of claim 23 wherein the instructions cause the control subsystem to:

subsequently from time to time control the at least one solid-state light source to be in the OFF state for the OFF period, and obtain at least one of the at least one photosensitive transducer signals, the at least one of the photosensitive transducer signals indicative of the at least one light condition in the illumination path sensed by the at least one photosensitive transducer during the OFF period;

store a plurality of the obtained photosensitive transducer signals in the non-transitory storage medium;

determine whether the plurality of obtained photosensitive transducer signals are above the first threshold value according to a turn OFF condition; and in response to determining that the obtained photosensitive transducer signals are above the first threshold value according to the turn OFF condition, control the at least one solid-state light source to be in the OFF state.

25. The luminaire of claim 24 wherein the instructions cause the control subsystem to:

in response to determining that the plurality of photosensitive transducer signals are above the first threshold value according to the turn OFF condition, obtain a current time and a current date;

associate the current time and the current date with a daily event; and store the associated current time, current date and daily event in the non-transitory storage medium.

26. The luminaire of claim 23 wherein the OFF period is less than or equal to 250 microseconds.

27. The luminaire of claim 23 wherein the instructions cause the control subsystem to:

receive at least one threshold change indication; and responsive to receiving the at least one threshold change indication, change the first threshold value based on the least one threshold change indication.

28. The luminaire of claim 23 wherein the instructions cause the control subsystem to:

subsequently from time to time at a rate greater than or equal to a sampling frequency control the at least one solid-state light source to be in the OFF state for the OFF period, and obtain at least one of the at least one photosensitive transducer signals, the at least one of the photosensitive transducer signals indicative of the at least one light condition in the illumination path sensed by the at least one photosensitive transducer during the OFF period.

* * * * *